United States Patent
Yoo et al.

(10) Patent No.: US 9,223,177 B2
(45) Date of Patent: Dec. 29, 2015

(54) ACRYLATE COMPOUND HAVING PHOTOREACTIVE GROUP, PHOTOREACTIVE ACRYLATE POLYMER AND PHOTO-ALIGNMENT LAYER COMPRISING THE SAME

(71) Applicant: LG CHEM, LTD., Seoul (KR)

(72) Inventors: Dong-Woo Yoo, Daejeon (KR);
Sung-Ho Chun, Daejeon (KR);
Dai-Seung Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 36 days.

(21) Appl. No.: 14/093,204

(22) Filed: Nov. 29, 2013

(65) Prior Publication Data
US 2014/0161993 A1    Jun. 12, 2014

(30) Foreign Application Priority Data

Nov. 29, 2012  (KR) .................. 10-2012-0137303
Nov. 28, 2013  (KR) .................. 10-2013-0146032

(51) Int. Cl.
C09K 19/00     (2006.01)
G02F 1/1337    (2006.01)

(52) U.S. Cl.
CPC .... G02F 1/133711 (2013.01); G02F 1/133788 (2013.01); *Y10T 428/1005* (2015.01)

(58) Field of Classification Search
CPC .......... G02F 1/133711; G02F 1/13378; G02F 1/133788; G02F 2001/133726; Y10T 428/10; Y10T 428/1005; C08F 12/32; C08F 32/00; C07C 69/753

USPC ........... 428/1.1, 1.2; 525/219, 302, 303, 304; 560/81; 526/313, 321, 326; 349/123
See application file for complete search history.

(56) References Cited

U.S. PATENT DOCUMENTS

| 5,464,669 A | 11/1995 | Kang et al. |
| 6,174,649 B1 * | 1/2001 | Park et al. ..................... 430/321 |
| 2007/0098922 A1 * | 5/2007 | Kim et al. .................... 428/1.21 |

FOREIGN PATENT DOCUMENTS

| JP | 62-093258 A | 4/1987 |
| KR | 10-2012-0031912 A | 4/2012 |
| KR | 10-2012-0077468 A | 7/2012 |
| WO | WO 2009091224 A2 * | 7/2009 |

OTHER PUBLICATIONS

Vijayanand et al "Novel Photosensitive Polymer", Jan. 2007, J. Macromol. Sci., Part A, V44, p. 727-734.*

(Continued)

*Primary Examiner* — Ruiyun Zhang
(74) *Attorney, Agent, or Firm* — Dentons US LLP

(57) ABSTRACT

Disclosed herein are an acrylate compound having a photoreactive group, a photoreactive acrylate polymer, and a photoalignment layer including the same that not only have excellent alignment properties and alignment rate and readiness for change in the alignment direction based on the polarization direction of radiation, but also exhibit a high solubility to organic solvents and good workability.

11 Claims, 2 Drawing Sheets

(56) References Cited

OTHER PUBLICATIONS

M. Schadt etc., "Surface-Induced Parallel Alignment of Liquid Crystals by Linearly Polymerized Photopolymers" Jpn. J. Appl. Phys., vol. 31., 1992, pp. 2155-2164.

Yuiy Reznikov, "Peculiarity of an Oblique Liquid Crystal Alignment Induced by a Photosensitive Orientant" Jpn. J. Appl. Phys. vol. 34, 1995, pp. L1000-L1002.

Toshio et al., 'Studies of hypolipidemic agents. 1. Synthesis and hypolipidemic activities of alkoxycinnamic acid derivatives', 1980, J. Med. Chem., vol. 23, pp. 50-59.

* cited by examiner

ACRYLATE COMPOUND HAVING PHOTOREACTIVE GROUP, PHOTOREACTIVE ACRYLATE POLYMER AND PHOTO-ALIGNMENT LAYER COMPRISING THE SAME

This application claims priority to Korean Patent Application Nos. 10-2012-0137303, filed on Nov. 29, 2012 and 10-2013-0146032, filed on Nov. 28, 2013, with the Korean Patent Office, all of which are incorporated herein in their entirety by reference.

FIELD OF THE INVENTION

The present invention relates to an acrylate compound having a photoreactive group, a photoreactive acrylate polymer, and a photo-alignment layer comprising the same and, more particularly, to an acrylate compound having a photoreactive group, a photoreactive acrylate polymer, a preparation method for the same, and a photo-alignment layer comprising the same, where the acrylate compound not only has excellences in alignment properties and alignment rate and readiness for change in the alignment direction based on the polarization direction of radiation but also exhibits a high solubility to organic solvents and good workability.

BACKGROUND ART

With a recent advent of large-sized LCDs and a gradual expansion of their usage from personal devices, such as mobile phones, lap-top computers, etc., to home appliances, such as wall mounted flat panel TVs, there is a demand for LCDs with high definition and wide viewing angle. In particular, TFT-driven thin film transistor LCDs (TFT-LCDs) of which each pixel is independently driven are much superior in response speed of liquid crystals, realizing high-definition motion pictures, and thus increasingly used in a wider range of applications.

To be used as an optical switch in the TFT-LCDs, liquid crystals are required to be initially aligned in a defined direction on a layer including innermost TFT of the display cell. For this, a liquid crystal alignment layer is used.

For the liquid crystal alignment to occur, a polymer alignment layer is formed and then subjected to a rubbing process using a rotary roller wound with a rubbing cloth of nylon or rayon fabrics at a high rotation speed to align liquid crystals. However, the rubbing process remains mechanical scratches on the surface of the liquid crystal alignment layer or generates strong static electricity, possibly destroying the TFTs. Further, fine fibers coming from the rubbing cloth may cause defects of the products, bringing about an obstacle to acquiring a high production yield.

In an attempt to overcome the problems with the rubbing process and achieve innovation in the aspect of production yield, there has been contrived a liquid crystal alignment method using a light such as UV radiation (hereinafter, referred to as "photo-alignment").

Photo-alignment refers to the mechanism using a linearly polarized UV radiation to cause the photoreactive groups of a defined photoreactive polymer to participate in a photoreaction, aligning the main chain of the polymer in a defined direction to form a photo-polymerized liquid crystal alignment layer with aligned liquid crystals.

The representative example of the photo-alignment is photopolymerization-based photo-alignment as disclosed by M. Schadt et al. (Jpn. J. Appl. Phys., Vol 31., 1992, 2155), Dae S. Kang et al. (U.S. Pat. No. 5,464,669), and Yuriy Reznikov (Jpn. J. Appl. Phys. Vol. 34, 1995, L1000). The photo-aligned polymers used in these patent and research papers are mostly polycinnamate polymers, such as poly(vinylcinnamate) (PVCN) or poly(vinyl methoxycinnamate) (PVMC). In the case of photo-alignment of the polymers, the double bond of cinnamate exposed to UV radiation participates in a [2+2] cycloaddition reaction to form cyclobutane, which provides anisotropy to cause liquid crystal molecules aligned in one direction, inducing liquid crystal alignment.

However, the conventional photoreactive polymers for alignment layer have their main chain with poor thermal stability or exhibit poor characteristics in regards to photoreactivity, alignment properties, or alignment rate.

To solve this problem, there has been developed a photoreactive polymer having a long spacer added between the main chain and the photoreactive group to improve in photoreactivity and alignment properties, or a photoreactive cyclic-olefin polymer having a photoreactive group with improved alignment properties or the like. Undesirably, the photoreactive polymer having a long spacer added between the main chain and the photoreactive group has poor thermal stability, and the photoreactive cyclic-olefin polymer has a low solubility to organic solvents and consequently poor workability for forming a photo-alignment layer.

On the other hand, there has recently been a demand for using photo-alignment layers in the fields of applications, such as patterned retarders, patterned cell alignment layers, or the like, that require a change of the anisotropic direction based on the polarization direction to create three-dimensional stereoscopic images. But the conventional photoreactive polymers have no change in the alignment direction already determined by the polarized radiation. And, if any change in the alignment direction is made, it is required to use a greater intensity of radiation polarized in a different direction. Accordingly, there is a demand for developing a novel photoreactive polymer having readiness for change in the alignment direction based on the polarization direction of radiation.

SUMMARY OF THE INVENTION

The present invention provides an acrylate compound having a photoreactive group and a photoreactive acrylate polymer that not only have excellences in alignment properties and alignment rate and readiness for change in the alignment direction based on the polarization direction of radiation but also exhibit a high solubility to organic solvents and good workability.

The present invention also provides a method for preparing the acrylate compound having a photoreactive group or the photoreactive acrylate polymer.

The present invention also provides a photo-alignment layer comprising the acrylate compound having a photoreactive group or the photoreactive acrylate polymer, and a display device comprising the same.

Accordingly, the present invention provides an acrylate compound having a photoreactive group as represented by the following formula 1:

[Formula 1]

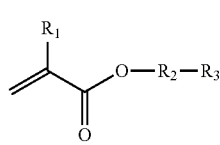

wherein R1 is hydrogen or substituted or unsubstituted alkyl having 1 to 3 carbon atoms;

R2 is a chemical bond or a radical selected from the group consisting of substituted or unsubstituted linear or branched alkylene having 1 to 20 carbon atoms, substituted or unsubstituted linear or branched alkenylene having 2 to 20 carbon atoms, substituted or unsubstituted linear or branched alkynylene having 2 to 20 carbon atoms, substituted or unsubstituted cycloalkylene having 3 to 12 carbon atoms, and substituted or unsubstituted arylene having 6 to 40 carbon atoms; and R3 is at least one radical bonded to R2 and represented by the following formula 1a:

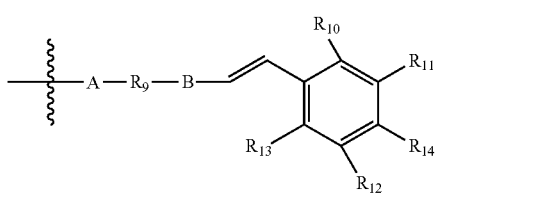

[Formula 1a]

wherein A is chemical bond, oxygen, sulfur, or —NH—;

B is selected from the group consisting of chemical bond, substituted or unsubstituted alkylene having 1 to 20 carbon atoms, carbonyl, —C(=O)O—, —O—C(=O)—, substituted or unsubstituted arylene having 6 to 40 carbon atoms, and substituted or unsubstituted heteroarylene having 6 to 40 carbon atoms;

R9 is selected from the group consisting of chemical bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms; and at least one of R10 to R14 is a radical represented by -L-R15-R16-(substituted or unsubstituted aryl having 6 to 40 carbon atoms), wherein among the R10 to R14, the remainders other than the radical of -L-R15-R16-(substituted or unsubstituted aryl having 6 to 40 carbon atoms) are the same as or different from one another and independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, and heteroaryl having 6 to 40 carbon atoms with hetero elements in Group 14, 15 or 16;

L is selected from the group consisting of oxygen, sulfur, —NH—, substituted or unsubstituted alkylene having 1 to 20 carbon atoms, carbonyl, —C(=O)O—, —O—C(=O)—, —CONH—, and substituted or unsubstituted arylene having 6 to 40 carbon atoms;

R15 is substituted or unsubstituted alkylene having 1 to 10 carbon atoms; and

R16 is selected from the group consisting of chemical bond, —O—, —C(=O)O—, —OC(=O)—, —NH—, —S—, and —C(=O)—.

The present invention also provides a photoreactive acrylate polymer comprising a repeating unit of the following formula 3:

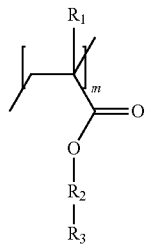

[Formula 3]

wherein m is 50 to 5,000; and R1, R2 and R3 are as defined in the formula 1.

The present invention also provides a method for preparing the photoreactive acrylate polymer of the formula 3, comprising the step of performing a radical polymerization reaction using a monomer represented by the following formula 1 in the presence of an initiator:

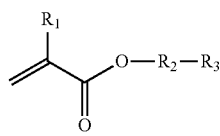

[Formula 1]

wherein R1, R2, and R3 are as defined above.

The present invention also provides a photo-alignment layer comprising the acrylate compound of the formula 1 or the photoreactive acrylate polymer of the formula 3.

The present invention also provides a liquid crystal retardation film comprising: the photo-alignment layer, and a liquid crystal layer formed on the photo-alignment layer.

The present invention also provides a display device comprising the photo-alignment layer.

The acrylate compound of the present invention and the photoreactive acrylate polymer obtained from the same have a photoreactive group the end of which is bonded to a defined bulky substituent. The existence of the bulky substituent renders the compound and the polymer of the present invention to be far superior in alignment properties and alignment rate to the conventional photoreactive polymers. Moreover, the compound and the polymer of the present invention are relatively free to move and thus considerably ready to change in the alignment direction based on the polarization direction of radiation. With this characteristic, the compound and the polymer of the present invention can be desirably applied to patterned retarders, patterned cell alignment layers, etc. that are used to create three-dimensional images.

Further, the compound and the polymer of the present invention have an acrylate main-chain structure, so they exhibit a high solubility to various organic solvents and hence good workability in forming a photo-alignment layer, even forming a photo-alignment layer in the form of a monomer.

Accordingly, the photoreactive polymer can be preferably used as a photo-aligned polymer in various coating compositions and alignment layers formed from the coating compositions applicable to various LCD devices, and the alignment layer comprising the photoreactive polymer has excellent characteristics.

DETAILED DESCRIPTION OF THE EMBODIMENTS

Figure 1:
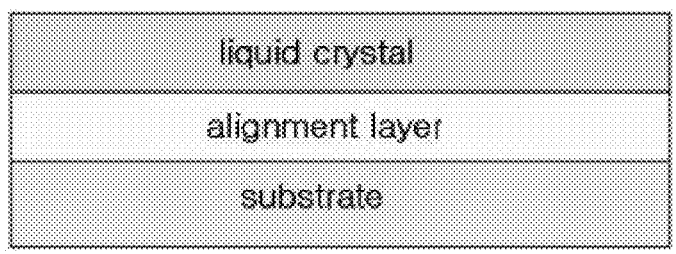
FIG. 1 is a schematic diagram showing an exemplary structure of a general liquid crystal alignment layer or liquid crystal retardation film.

Hereinafter, a detailed description will be given as to an acrylate compound having a photoreactive group, a photoreactive acrylate polymer, and preparation methods for the same according to exemplary embodiments of the present invention.

In accordance with a first exemplary embodiment of the invention, there is provided an acrylate compound having a photoreactive group as represented by the following formula 1:

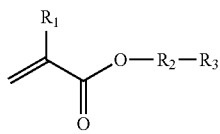

[Formula 1]

In the formula 1, R1 is hydrogen or substituted or unsubstituted alkyl having 1 to 3 carbon atoms; R2 is a chemical bond or a radical selected from the group consisting of substituted or unsubstituted linear or branched alkylene having 1 to 20 carbon atoms, substituted or unsubstituted linear or branched alkenylene having 2 to 20 carbon atoms, substituted or unsubstituted linear or branched alkynylene having 2 to 20 carbon atoms, substituted or unsubstituted cycloalkylene having 3 to 12 carbon atoms, and substituted or unsubstituted arylene having 6 to 40 carbon atoms; and R3 is at least one radical bonded to R2 and represented by the following formula 1a:

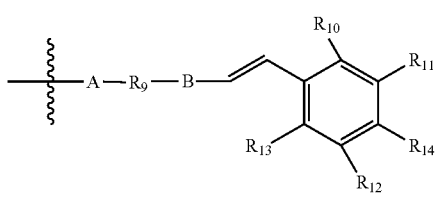

[Formula 1a]

In the formula 1a, A is chemical bond, oxygen, sulfur, or —NH—; B is selected from the group consisting of chemical bond, substituted or unsubstituted alkylene having 1 to 20 carbon atoms, carbonyl, —C(=O)O—, —O—C(=O)—, substituted or unsubstituted arylene having 6 to 40 carbon atoms, and substituted or unsubstituted heteroarylene having 6 to 40 carbon atoms; R9 is selected from the group consisting of chemical bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms; and at least one of R10 to R14 is a radical represented by -L-R15-R16-(substituted or unsubstituted aryl having 6 to 40 carbon atoms), where among the R10 to R14, the remainders other than the radical of -L-R15-R16-(substituted or unsubstituted aryl having 6 to 40 carbon atoms) are the same as or different from one another and independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, and heteroaryl having 6 to 40 carbon atoms with hetero elements in Group 14, 15 or 16; L is selected from the group consisting of oxygen, sulfur, —NH—, substituted or unsubstituted alkylene having 1 to 20 carbon atoms, carbonyl, —C(=O)O—, —O—C(=O)—, —CONH—, and substituted or unsubstituted arylene having 6 to 40 carbon atoms; R15 is substituted or unsubstituted alkylene having 1 to 10 carbon atoms; and R16 is selected from the group consisting of chemical bond, —O—, —C(=O)O—, —OC(=O)—, —NH—, —S—, and —C(=O)—.

In the acrylate compound of the first exemplary embodiment, the radical of -L-R15-R16-(substituted or unsubstituted aryl having 6 to 40 carbon atoms) may be represented by the following formula 2, where the linker L is oxygen; and the acryl is phenyl. As well, the radical may have the formula 2 that has any other type of aryl and linker L.

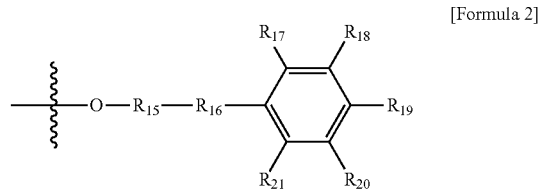

[Formula 2]

In the formula 2, R15 and R16 are as defined in the formula 1; and R17 to R21 are the same as or different from one another and independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, heteroaryl having 6 to 40 carbon atoms with hetero elements in Group 14, 15 or 16, and substituted or unsubstituted alkoxyaryl having 6 to 40 carbon atoms.

Such an acrylate compound has a substituent bonded to the ends of the photoreactive groups such as cinnamate and represented by -L-R15-R16-(substituted or unsubstituted aryl having 6 to 40 carbon atoms). The substituent comprises an aralkyl structure that alkyl and aryl groups are sequentially connected together via a linker L. As the bulky chemical structure like aralkyl is bonded to the ends of photoreactive groups via a linker L, a large free volume is available between the photoreactive groups. This presumably results from the steric hindrance between adjacent bulky aralkyl structures.

For this reason, photoreactive groups such as cinnamate in the acrylate compound are relatively free to move (flow) or react in such a large free volume, minimizing hindrance from other reactors or substituents. Consequently, the photoreactive groups in the acrylate compound and the polymer and the photo-alignment layer using the same can improve greatly in photoreactivity, alignment rate, and photo-alignment properties. Especially, photoreactive groups like cinnamate undergo photo-alignment, which takes place as a simultaneous occurrence of dimerization and isomerization caused by polarized radiation. The photo-alignment occurs more easily and rapidly without any hindrance in such a large free volume. Accordingly, the compound of the first exemplary embodiment, and the polymer and the photo-alignment layer prepared using the same can improve greatly in photoreactivity, alignment properties, and alignment rate.

In the compound of the first exemplary embodiment, a large free volume is provided between adjacent photoreactive groups to render the photoreactive groups relatively ready to change in the alignment direction based on the change in the polarization direction of radiation. Consequently, the alignment direction may be easily changed according to the polarization direction of radiation, and the photoreactive polymer can be preferably applied to patterned retarders, patterned cell alignment layers, or the like that are used to achieve stereoscopic imaging.

With a recent demand for wide viewing angles, there have been many attempts to realize wide viewing angles by substituting photo-alignment layers for TFT-cell alignment layers and patterning liquid crystals through multidirectional patterning. As for the conventional alignment layers of which the alignment direction is determined by the polarization direction, it is necessary to carry out a patterning process using two masks when a pattern of the specific direction is required. In contrast, as for the photoreactive polymer and the alignment layer comprising the photoreactive polymer according to the embodiment, the alignment direction even after exposure to polarized radiation of a specific direction can be changed again by polarized radiation of a different direction, realizing a desired alignment layer through a single-mask process.

In addition to this, the compound of the first exemplary embodiment or the polymer formed from the same has an acrylate main-chain structure and thus exhibits a high solubility to various organic solvents and good coatability and adhesiveness to various substrates such as resin or glass substrates. Therefore, the compound of the first exemplary embodiment can provide good workability when used as a photo-alignment material to form a photo-alignment layer. Further, the compound of the first exemplary embodiment or the like can provide good alignment properties without adding a long spacer between the main chain and the photoreactive group, ending up with relatively good thermal stability.

As a result, the acrylate compound of the first exemplary embodiment or the like not only has excellences in alignment properties and alignment rate and readiness for change in the alignment direction based on the polarization direction of radiation, but also possesses good workability for forming a photo-alignment layer.

Hereinafter, a further detailed description will be given as to the acrylate compound of the first exemplary embodiment and the photoreactive acrylate polymer prepared from the same.

In the acrylate compound, the substituted or unsubstituted aryl having 6 to 40 carbon atoms or the heteroaryl having 6 to 40 carbon atoms with hetero elements in Group 14, 15 or 16 may be selected from the group consisting of the following functional groups; or any other aryl or heteroaryl:

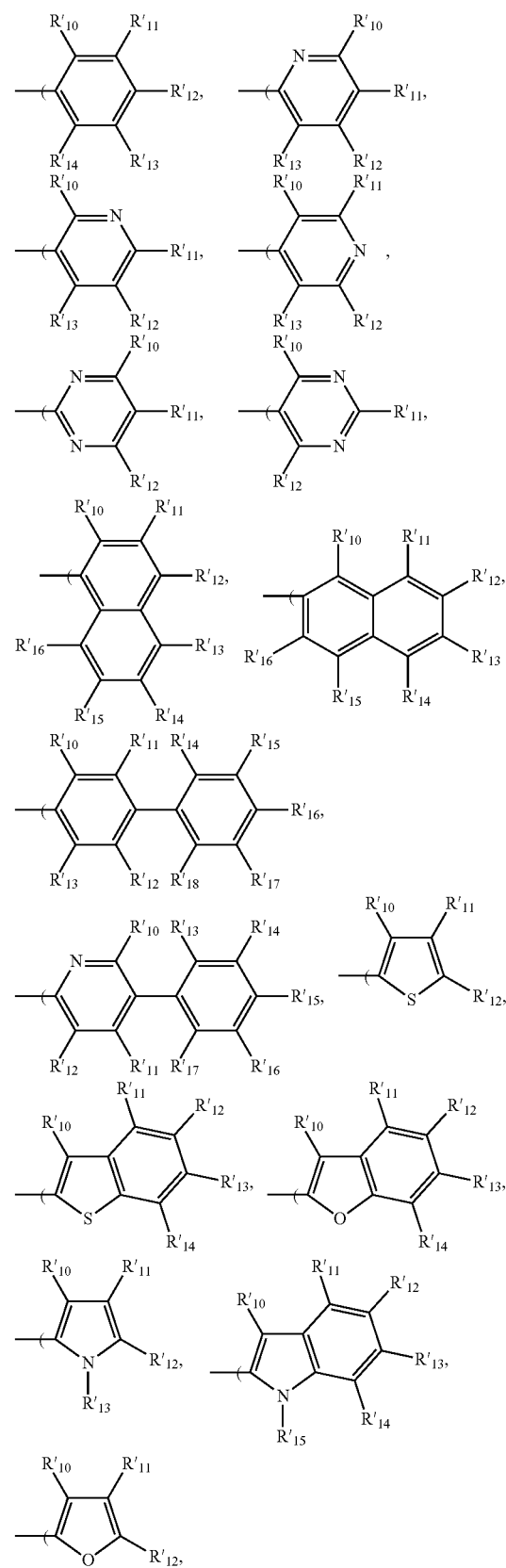

In the above formulas, R'10 to R'18 are the same as or different from one another and independently selected from the group consisting of hydrogen, substituted or unsubstituted linear or branched alkyl having 1 to 20 carbon atoms, substituted or unsubstituted alkoxy having 1 to 20 carbon atoms, substituted or unsubstituted aryloxy having 6 to 30 carbon atoms, and substituted or unsubstituted aryl having 6 to 40 carbon atoms.

In the acrylate compound, at least one of the photoreactive group of R3 represented by the formula 1a may be bonded to R2 depending on the type of R2. For example, at least two of the photoreactive group may be bonded to R2, when R2 is cycloalkylene or arylene. More appropriately, one to three, or one to two, or one or two of the photoreactive group may be bonded to R2 in consideration of the adequate free volume between the photoreactive groups, the resultant good alignment properties, and the readiness for change in the alignment direction based on the polarization direction of radiation.

In the above-described structure of the acrylate compound of the first exemplary embodiment, the respective substituents are specifically defined as follows:

The term "alkyl" as used herein means a monovalent linear or branched saturated hydrocarbon portion having 1 to 20 carbon atoms, or 1 to 10 carbon atoms, or 1 to 6 carbon atoms. The alkyl group inclusively refers to alkyl groups unsubstituted or additionally substituted with a specific substituent after-mentioned. The examples of the alkyl group may comprise methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" as used herein means a monovalent linear or branched hydrocarbon portion having 2 to 20 carbon atoms, or 2 to 10 carbon atoms, or 2 to 6 carbon atoms with at least one carbon-carbon double bond. The alkenyl group may be bonded through carbon atoms including a carbon-carbon double bond or through saturated carbon atoms. The alkenyl group inclusively refers to alkenyl groups unsubstituted or additionally substituted with a specific substituent after-mentioned. The examples of the alkenyl group may comprise ethenyl, 1-propenyl, 2-propenyl, 2-butenyl, 3-butenyl, pentenyl, 5-hexenyl, dodecenyl, etc.

The term "cycloalkyl" as used herein means a monovalent saturated or unsaturated mono-, bi- or tri-cyclic non-aromatic hydrocarbon portion having 3 to 12 ring-carbon atoms. The cycloalkyl group inclusively refers to cycloalkyl groups additionally substituted with a specific substituent after-mentioned. The examples of the cycloalkyl group may comprise cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl), etc.

The term "aryl" as used herein means a monovalent mono-, bi- or tri-cyclic aromatic hydrocarbon portion having 6 to 40 ring-carbon atoms, or 6 to 12 ring-carbon atoms. The aryl group inclusively refers to aryl groups additionally substituted with a specific substituent after-mentioned. The examples of the aryl group may comprise phenyl, naphthalenyl, fluorenyl, etc.

The term "alkoxyaryl" as used herein means the above-defined aryl group in which at least one hydrogen atom is substituted by an alkoxy group. The examples of the alkoxyaryl group may comprise methoxyphenyl, ethoxyphenyl, propoxyphenyl, butoxyphenyl, pentoxyphenyl, hextoxyphenyl, heptoxy, octoxy, nanoxy, methoxybiphenyl, methoxynaphthalenyl, methoxyfluorenyl, methoxyanthracenyl, etc.

The term "aralkyl" as used herein means the above-defined alkyl group in which at least one hydrogen atom is substituted by an aryl group. The aralkyl group inclusively refers to aralkyl groups additionally substituted with a specific substituent after-mentioned. The examples of the aralkyl may comprise benzyl, benzhydryl, trityl, etc.

The term "alkynyl" as used herein means a monovalent linear or branched hydrocarbon portion having 2 to 20 carbon atoms, or 2 to 10 carbon atoms, or 2 to 6 carbon atoms with at least one carbon-carbon triple bond. The alkynyl group may be bonded through carbon atoms including a carbon-carbon triple bond or through saturated carbon atoms. The alkynyl group inclusively refers to alkynyl groups additionally substituted with a specific substituent after-mentioned. The examples of the alkynyl group may comprise ethynyl, propynyl, etc.

The term "alkylene" as used herein means a divalent linear or branched saturated hydrocarbon portion having 1 to 20 carbon atoms, or 1 to 10 carbon atoms, or 1 to 6 carbon atoms. The alkylene group inclusively refers to alkylene groups additionally substituted with a specific substituent after-mentioned. The examples of the alkylene group may comprise methylene, ethylene, propylene, butylene, hexylene, etc.

The term "alkenylene" as used herein means a divalent linear or branched hydrocarbon portion having 2 to 20 carbon atoms, or 2 to 10 carbon atoms, or 2 to 6 carbon atoms with at least one carbon-carbon double bond. The alkenylene group may be bonded through carbon atoms including a carbon-carbon double bond and/or through saturated carbon atoms. The alkenylene group inclusively refers to alkenylene groups additionally substituted with a specific substituent after-mentioned.

The term "cycloalkylene" as used herein means a divalent saturated or unsaturated mono-, bi- or tri-cyclic non-aromatic hydrocarbon portion having 3 to 12 ring-carbon atoms. The cycloalkylene group inclusively refers to cycloalkylene groups additionally substituted with a specific substituent after-mentioned. The examples of the cycloalkylene group may comprise cyclopropylene, cyclobutylene, etc.

The term "arylene" as used herein means a divalent mono-, bi- or tri-cyclic aromatic hydrocarbon portion having 6 to 20 ring-carbon atoms, or 6 to 12 ring-carbon atoms. The arylene group inclusively refers to arylene groups additionally substituted with a specific substituent after-mentioned. The aromatic portion comprises carbon atoms only. The examples of the arylene may comprise phenylene, etc.

The term "aralkylene" as used herein means a divalent portion of the above-defined alkyl group in which at least one hydrogen atom is substituted by an aryl group. The aralkylene group inclusively refers to aralkylene groups additionally substituted with a specific substituent after-mentioned. The examples of the aralkylene group may comprise benzylene, etc.

The term "alkynylene" as used herein means a divalent linear or branched hydrocarbon portion having 2 to 20 carbon atoms, or 2 to 10 carbon atoms, or 2 to 6 carbon atoms with at least one carbon-carbon triple bond. The alkynylene group may be bonded through carbon atoms including a carbon-carbon triple bond or through saturated carbon atoms. The alkynylene group inclusively refers to alkynylene groups additionally substituted with a specific substituent after-mentioned. The examples of the alkynylene group may comprise ethynylene, propynylene, etc.

In the above description, the substituent "substituted or unsubstituted" has as an inclusive meaning that it includes the substituent itself or the substituent further substituted with a specific substituent. If not stated otherwise in this specification, the examples of the substituent further replaced for each substituent may comprise halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, or the like.

On the other hand, the acrylate compound of the first exemplary embodiment may be prepared, for example, by either of the two methods as given below.

Firstly, according to a first embodiment, the acrylate compound may be prepared by reacting a compound of the following formula 1b and a compound of the following formula 1c:

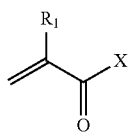

[Formula 1b]

HO—R2-R3  [Formula 1c]

In the formulas 1b and 1c, R1, R2 and R3 are as defined in the formula 1; and X is halogen or hydroxyl group.

According to the preparation method of the first embodiment, in the compound having a halogen or hydroxyl group as given by the formula 1b, the halogen or hydroxyl group may be substituted with —O—R2-R3 derived from the formula 1c, forming an acrylate compound of the formula 1 according to the first exemplary embodiment. The specific reaction conditions and procedures of the preparation method may follow the general substitution reaction conditions and procedures.

If desired, an acrylate compound of the formula 1 where R2 and R3 are bonded through oxygen (for example, the acrylate compound of the formula 1, where "A" of the formula 1a is oxygen) may be prepared according to a second embodiment by reacting a defined hydroxy acrylate compound and a compound having a leaving group bonded to a photoreactive group. For example, the preparation method for the acrylate compound may comprise the step of reacting a compound of the following formula 1d and a compound of the following formula 1e:

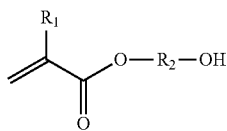

[Formula 1d]

R3'-Y  [Formula 1e]

In the formulas 1d and 1e, R1 and R2 are as defined in the formula 1; and R3' is a radical represented by the following formula 2a, where R9 to R14 and B are as defined in the formula 1a; and Y is a leaving group of halogen:

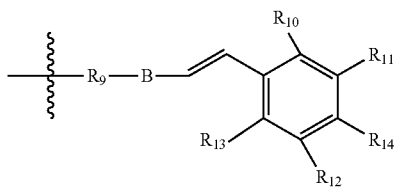

[Formula 2a]

According to the preparation method of the second embodiment, the photoreactive group of R3 in the compound having a leaving group (for example, halogen) as given by the formula 1e is substituted for the hydrogen atom of the hydroxyl group in the formula 1d and thus bonded to R2 via the oxygen atom, forming an acrylate compound of the first exemplary embodiment as represented by the formula 1, where A is oxygen. The specific reaction conditions and procedures of the preparation method may follow the general nucleophilic substitution reaction conditions and procedures and will not be further described in detail.

In accordance with a second exemplary embodiment of the present invention, there is provided a photoreactive acrylate polymer comprising a repeating unit of the following formula 3:

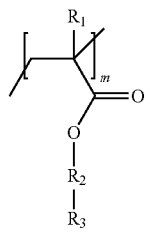

[Formula 3]

In the formula 3, m is 50 to 5,000; and R1, R2 and R3 are as defined in the formula 1.

The photoreactive acrylate polymer, which comprises a repeating unit derived from the compound of the above-described first exemplary embodiment, can secure a large free volume between the photoreactive groups because of the bulky aralkyl structure bonded to the ends of the photoreactive groups via the linker L. For this reason, the photoreactive acrylate polymer can have the photoreactive groups relatively free to move (float) in the large free volume. Hence, the polymer of the second exemplary embodiment can improve in photoreactivity, alignment rate, and photo-alignment properties. Further, the polymer of the second exemplary embodiment has the photoreactive groups relatively easy and ready to change in the alignment direction according to the changed polarization direction of radiation. Therefore, the polymer can have readiness for change in the alignment direction based on the polarization direction of radiation and thus can be desirably applied to patterned retarders, patterned cell alignment layers, or the like.

Like the acrylate compound of the first exemplary embodiment, the polymer of the second exemplary embodiment has an acrylate main-chain structure and thus exhibits a high solubility to various organic solvents and good coatability and adhesiveness to various substrates. Accordingly, the polymer of the second exemplary embodiment can have good workability in forming a photo-alignment layer.

The definitions of the respective substituents bonded to the photoreactive acrylate polymer are specified above in connection to the compound of the formula 1 and will not be described any more.

The photoreactive polymer may comprise at least one repeating unit selected from the group consisting of the repeating units of the formula 3a or 3b, or may be a copolymer that further comprises another type of repeating unit. The examples of the repeating unit may comprise any olefin-, acrylate- or cyclic-olefin-based repeating unit with or without a bonding to photoreactive cinnamate, chalcone or azo groups. The exemplary repeating units are disclosed in Korean Patent Laid-open Publication No. 2010-0021751.

To prevent deterioration of the excellent characteristics pertaining to the formula 3, the photoreactive polymer may comprise the repeating unit of the formula 3 in an amount of at least about 50 mol %, at least about 70 mol %, or at least about 90 mol %.

The repeating unit of the formula 3 constituting the polymer of the second exemplary embodiment may have a degree of polymerization in the range of about 50 to 5,000, or about 100 to 4,000, or about 1,000 to 3,000. The polymer of the second exemplary embodiment may also have a weight average molecular weight of 10,000 to 1,000,000, or about 50,000 to 5,000,000, or about 80,000 to 4,000,000, or about 100,000 to 3,000,000. Accordingly, the polymer of the second exemplary embodiment can be appropriately contained in a coating composition for forming a photo-alignment layer to provide improved workability, and the alignment layer formed from the coating composition can improve in alignment properties.

The polymer of the second exemplary embodiment may exhibit photoreactivity upon exposure to a polarized radiation having a wavelength of about 150 to 450 nm. For example, the polymer can have excellences in photoreactivity and alignment properties upon exposure to polarized UV radiation having a wavelength of about 200 to 400 nm, more specifically about 250 to 350 nm.

In accordance with a third exemplary embodiment of the invention, there is provided a method for preparing the photoreactive acrylate polymer. The preparation method may comprise the step of performing a radical polymerization using a monomer of the following formula 1 in the presence of an initiator:

[Formula 1]

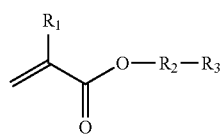

In the formula 1, R1, R2, R3 and R4 are as defined above.

The preparation method provides an easy way to prepare the repeating unit of the formula 3 having a vinyl group of the formula 1 and the photoreactive acrylate polymer comprising the same through radical polymerization of the monomer of the formula 1. Particularly, this preparation method can form the photoreactive acrylate polymer of the formula 3 with high product yield by way of a simple polymerization process without using a transition metal catalyst which is required to have high activity and difficult to choose and handle.

In the preparation method according to the second exemplary embodiment, the initiator may comprise all types of thermal initiator or photo initiator such as UV initiator that are known to initiate a radical polymerization. The specific examples of the initiator may comprise AIBN, benzoyl peroxide, t-butyl peroxide, tert-amyl peroxybenzoate, 1,1'-azobis(cyclohexane carbonitrile), 2,2-bis(tert-butyl peroxy)butane, 1,1-bis(tert-butyl peroxy)cyclohexane, 2,5-bis(tert-butyl peroxy)-2,5-dimethylhexane, 2,5-bis(tert-butyl peroxy)-2,5-dimethyl-3-hexine, bis(1-(tert-butyl peroxy)-1-methylethyl)benzene, 1,1-bis(tert-butyl peroxy)-3,3,5-trimethylcyclohexane, tert-butyl hydroperoxide, tert-butyl peracetate, tert-butyl peroxy isopropyl carbonate, cumene hydroperoxide, cyclohexanone peroxide, dicumyl peroxide, lauroyl peroxide, and peracetic acid. It is of course possible to use at least two of these initiators. The initiator as used herein may include those commercially available, such as, for example, V-40, V-59, V-60, V-65, V-70, V-601, VA-80, VA-85, VA-86, VAm-96, VAm-110, VAm-111, VA-044, VA-046B, VA-057, VA-060, AAm-027, or AAm-028, which are manufactured by Wako Chemicals.

The initiator may be used in an amount of about 0.0002 to 0.1 mole, or about 0.001 to 0.08 mole, or about 0.01 to 0.05 mole, with respect to one mole of the monomer comprising the formula 1. Such an amount of the initiator may be used to appropriately initiate the polymerization of the monomer of the formula 1 to prepare the photoreactive acrylate polymer of the second exemplary embodiment.

The polymerization process may be carried out in the temperature range of about 10 to 150° C., or about 30 to 100° C., or about 40 to 90° C. The polymerization temperature extremely low may lead to low polymerization activity, while the polymerization temperature extremely high may cause a thermal polymerization of the acrylate functional group, making it difficult to control the molecular weight of the product.

Further, the polymerization process may be performed in an organic solvent, which may comprise any organic solvent capable of appropriately dissolving the monomer of the formula 1 and the initiator. The specific examples of the organic solvent may comprise THF, dichloromethane (MC), chloroform, carbon tetrachloride, toluene, benzene, xylene, cyclohexane, ethylacetate, methylethylketone, methylisobutylketone, n-hexane, NMP, dioxane, propylene glycol monomethylether acetate, etc. Among these organic solvents, at least two of them may be selected and used in combination. Of course, it may also be possible to use different organic solvents known to be available as a reaction medium in the polymerization of the acrylate compounds.

The specific procedures and conditions for the preparation method of the photoreactive acrylate polymer according to the second exemplary embodiment are specified in the Examples after-mentioned.

In accordance with a fourth exemplary embodiment of the invention, there is provided a photo-alignment layer comprising the above-described acrylate compound having a photoreactive group according to the first exemplary embodiment or the photoreactive acrylate polymer according to the second exemplary embodiment. The photo-alignment layer may comprise those in the thin film form or photo-alignment films in the film form. In accordance with a fifth exemplary embodiment of the invention, there is provided a liquid crystal retardation film comprising the photo-alignment layer and a liquid crystal layer formed on the photo-alignment layer.

The photo-alignment layer and the liquid crystal retardation film comprising the same may be formed using a material in the form of a polymer as a photo-alignment material, that is, either the photoreactive acrylate polymer or the acrylate compound having a photoreactive group in the form of a monomer as represented by the formula 1. The acrylate compound having a photoreactive group as represented by the formula 1 is mixed with a binder after-mentioned, such as, for example, the binder of a multi-functional (meth)acrylate compound and used to prepare a coating composition. The resultant coating composition is applied on a substrate, exposed to a polarized radiation to undergo a photo-alignment process and then subjected to a UV curing process of the binder to form a binder resin by the generally known method, thereby forming a photo-alignment layer. Particularly, in the UV curing process of the binder, the acrylate compound of the formula 1 with an acrylate main-chain structure can be crosslinked or cured with at least part of the binder, ending up forming a crosslinked or cured product of the binder resin and the crosslinked polymer of the multi-functional (meth)acrylate compound. As a result, unlike the conventional photo-alignment layers which are possible to form primarily with a photo-alignment material in the form of a polymer, the photo-alignment layer of the invention can be formed to have the photo-alignment structure of the photoreactive groups stabilized by the structure crosslinked or cured with the binder resin and thus exhibit stability even in the form of a monomer and good photo-alignment properties.

On the other hand, the photo-alignment layer and the liquid crystal retardation film according to the fourth and fifth exemplary embodiments may be prepared by using the composition and the preparation method as known in the related art, excepting that the acrylate compound having a photoreactive group or the photoreactive acrylate polymer is used as a photo-alignment material.

For example, the photo-alignment layer may be formed by mixing the acrylate compound having a photoreactive group or the photoreactive acrylate polymer as a photo-alignment material, a binder, and a photo initiator, dissolving the mixture in an organic solvent to prepare a coating composition, applying the coating composition on a substrate, and then performing a photo-alignment process and a UV curing process of the binder.

In this regard, the binder as used herein may comprise a multi-functional (meth)acrylate compound having an at least bi-functional acrylate group, such as, for example, pentaerythritol triacrylate, dipentaerythritol hexaacrylate, trimethylol propane triacrylate, or tris(2-acryloyloxyethyl)isocyanurate, etc.; or any other UV-curable (meth)acrylate compound. In the case of using the binder to complete a photo-alignment layer through the UV curing process and a liquid crystal retardation film comprising the same, the photo-alignment layer or the like may comprise a binder resin formed by curing the binder; for example, a binder resin comprising a crosslinked polymer of the multi-functional (meth)acrylate compound having an at least bi-functional acrylate group.

The photo initiator as used herein may comprise any known photo initiator usable for photo-alignment layers without any particular restriction, including, for example, photo initiators known as Irgacure 907™ or Irgacure 819™.

The organic solvent as used herein may comprise toluene, anisole, chlorobenzene, dichloroethane, cyclohexane, cyclopentane, propylene glycol methylether acetate, etc. Any other organic solvent may also be used without particular restriction, because the above-specified photo-alignment material has a high solubility to different organic solvents.

In the coating composition, the content of the solid components comprising the photo-alignment material, the binder resin and the photo initiator may be in the range of about 1 to 15 wt. %. The content of the solid components is preferably about 10 to 15 wt. % to cast the photo-alignment layer into films; and about 1 to 5 wt. % to cast the photo-alignment layer into thin films.

The photo-alignment layer may be formed, for example, on a substrate, as shown in FIG. 1, or under liquid crystals to achieve liquid crystal alignment. In this regard, the substrate may be a cyclic polymer substrate, an acryl polymer substrate, or a cellulose polymer substrate. The coating composition is applied on the substrate by different methods, such as bar coating, spin coating, blade coating, etc. and then subjected to a photo-alignment process under polarized radiation and a UV curing process of the binder to complete a photo-alignment layer.

The photo-alignment process may be carried out apart from the UV curing process or simultaneously with the UV curing process. In the photo-alignment process, a polarized UV radiation having a wavelength of about 150 to 450 nm may be applied to bring about alignment. In the regard, the exposure intensity of the radiation is about 50 mJ/cm$^2$ to 10 J/cm$^2$, or about 500 mJ/cm$^2$ to 5 J/cm$^2$.

The UV radiation as used herein may be any UV radiation polarized by passing through or being reflected from (a) a polarizer using a dielectric anisotropic coating on the surface of a transparent substrate such as quartz glass, soda-lime glass, soda-lime-free glass, or the like; (b) a polarizer with fine aluminum or other metallic wires; or (c) a Brewster polarizer using reflection from quartz glass.

The substrate temperature during UV exposure is preferably the room temperature. Under circumstances, the substrate may be heated at 100° C. or below during UV exposure. Preferably, the final layer thus obtained from the above-described steps has a thickness of about 30 to 1,000 nm.

Under circumstances, the UV curing process for the binder may be performed after the photo-alignment process. The UV curing process may be carried out in almost the same manner of the photo-alignment process under the general curing conditions for multi-functional (meth)acrylate compounds. The UV curing process results in providing a binder resin formed after the curing of the binder, such as, for example, a binder resin comprising a crosslinked polymer of the multi-functional (meth)acrylate compound. The binder resin is crosslinked or cured with at least part of the photo-alignment material, including, for example, the acrylate compound having a photoreactive group; or the photo-alignment material is dispersed uniformly in the binder resin. This leads to stabilization of the photo-alignment material after the photo-alignment process.

After formation of the photo-alignment layer by the above-specified method, a liquid crystal layer is formed on the photo-alignment layer to complete a liquid crystal retardation film according to the general method. This photo-alignment layer, which comprises the above-specified photo-alignment material, can have good interaction with liquid crystal molecules, making it possible to achieve effective photo-alignment.

The photo-alignment layer or the liquid crystal retardation film may be applied to optical films or optical filters for achieving stereoscopic imaging.

The above-described method is adopted to form an alignment layer and a liquid crystal layer on the alignment layer, completing a liquid crystal retardation film according to a typical method. The use of the photoreactive polymer in the alignment layer enables the alignment layer to have good interactions with liquid crystal molecules, achieving effective photo-alignment.

The alignment layer or the liquid crystal retardation film is applicable to optical films or filters used to achieve stereoscopic imaging.

In accordance with a sixth exemplary embodiment of the invention, there is provided a display device comprising the photo-alignment layer. The display device may be a liquid crystal display device comprising the photo-alignment layer for liquid crystal alignment; or a stereoscopic imaging display device with optical films or optical filters comprising the photo-alignment layer for achieving stereoscopic imaging. The constituent components of the display device are the same as those of a typical display device, excepting that the above-specified photo-alignment material and the photo-alignment layer are included, and will not be described any more in further detail.

In the following are set forth preferred examples of the invention for better understanding of the invention. It is to be understood that the examples are only for illustrative purposes and are not intended to limit the scope of the invention.

Example 1

Preparation of
4-benzyloxy-cinnamate-propyl-acrylate (Preparation of Acrylate Compound Having Photoreactive Group)

4-Benzyloy-benzaldehyde (10 g, 47 mmol), malonic acid (2 eq.) and piperidine (0.1 eq.) were dissolved in pyridine (5 eq.) and stirred at 80° C. for 5 hours. After completion of the reaction, the reaction mixture was cooled down to the room temperature and neutralized with 3M HCl. The white solid thus obtained was filtered out and dried in a vacuum oven to yield 4-benzyloxy-cinnamic acid.

The 4-benzyloxy-cinnamic acid (5 g, 19.7 mmol) and thionyl chloride (5 eq) were put in MC and stirred at 60° C. overnight. Then, the reaction mixture was removed of the unreacted thionyl chloride and the solvent under vacuum to obtain 4-benzoyl cinnamoyl chloride.

The 4-benzoyl cinnamoyl chloride (5 g, 18.3 mmol), 3-hydroxy propyl acrylate (19.0 mmol), and TEA (57 mmol) were dissolved in THF and stirred at the room temperature for 24 hours. After completion of the stirring, diethylether was added to form a precipitate, which was then filtered out. A column chromatography using a developing solvent (EA: hexane=1:4) was carried out to yield a titled product, 4-benzyloxy-cinnamate-propyl-acrylate.

NMR (CDCl$_3$ (500 MHz), ppm): 1.18-1.33 (3, m) 3.71 (0.5, m) 4.12 (2, m) 5.07 (0.5, m) 5.11 (2, s) 5.85 (1, dd) 6.19 (1, m) 6.36 (1, d) 6.48 (1, dd) 7.3-7.5 (9, m) 7.63 (2, d).

Example 2

Preparation of 4-benzyloxy-cinnamate-propyl-methacrylate (Preparation of Acrylate Compound Having Photoreactive Group)

The procedures were performed in the same manner as described in Example 1, excepting that 3-hydroxy propyl methacrylate was used in place of 3-hydroxy propyl acrylate to prepare 4-benzyloxy-cinnamate-propyl-methacrylate.

NMR (CDCl$_3$ (500 MHz), ppm): 1.2-1.31 (3, m) 1.96 (3, t) 3.68 (0.5, m) 4.10 (2, m) 5.09 (0.5, m) 5.11 (2, s) 5.53 (1, m) 6.12 (1, m) 6.36 (1, d) 7.3-7.5 (9, m) 7.63 (2, d).

Example 3

Preparation of 4-benzyloxy-cinnamate-hexyl-acrylate (Preparation of Acrylate Compound Having Photoreactive Group)

The procedures were performed in the same manner as described in Example 1, excepting that 6-hydroxy hexyl acrylate was used in place of 3-hydroxy propyl acrylate to prepare 4-benzyloxy-cinnamate-hexyl-acrylate.

NMR (CDCl$_3$ (500 MHz), ppm): 1.10-1.21 (4, m) 1.28-1.41 (4, m) 3.73 (1, m) 4.09 (2, m) 5.01 (1, m) 5.11 (2, s) 5.85 (1, dd) 6.19 (1, m) 6.36 (1, m) 6.50 (1, dd) 7.3-7.5 (9, m) 7.63 (2, d).

Example 4

Preparation of 4-benzyloxy-cinnamate-hexyl-methacrylate (Preparation of Acrylate Compound Having Photoreactive Group)

The procedures were performed in the same manner as described in Example 1, excepting that 6-hydroxy hexyl methacrylate was used in place of 3-hydroxy propyl acrylate to prepare 4-benzyloxy-cinnamate-hexyl-methacrylate.

NMR (CDCl$_3$ (500 MHz), ppm): 1.02-1.11 (4, m) 1.23-1.33 (4, m) 1.95 (3, t) 3.65 (1, m) 3.99-4.15 (2, m) 5.05 (1, m) 5.11 (2, s) 5.56 (1, m) 6.19 (1, m) 6.36 (1, d) 7.3-7.5 (9, m) 7.63 (2, d).

Example 5

Preparation of 4-(4-fluoro-benzyloxy)-cinnamate-propyl-acrylate (Preparation of Acrylate Compound Having Photoreactive Group)

The procedures were performed in the same manner as described in Example 1, excepting that 4-(4-fluoro-benzyloxy)-benzaldehyde was used in place of 4-benzyloxy-benzaldehyde to prepare 4-(4-fluoro-benzyloxy)-cinnamate-propyl-acrylate.

NMR (CDCl$_3$ (500 MHz), ppm): 1.18-1.33 (3, m) 3.65 (0.5, m) 4.12 (2, m) 5.05 (2, s) 5.07 (0.5, m) 5.85 (1, dd) 6.11 (1, m) 6.30 (1, d) 6.48 (1, dd) 6.97 (2, dd) 7.10 (2, m) 7.4 (2, m) 7.49 (2, d) 7.65 (1, s).

Example 6

Preparation of 4-(4-fluoro-benzyloxy)-cinnamate-propyl-methacrylate (Preparation of Acrylate Compound Having Photoreactive Group)

The procedures were performed in the same manner as described in Example 5, excepting that 3-hydroxy propyl methacrylate was used in place of 3-hydroxy propyl acrylate to prepare 4-(4-fluoro-benzyloxy)-cinnamate-propyl-methacrylate.

NMR (CDCl$_3$ (500 MHz), ppm): 1.25 (3, m) 1.96 (3, t) 3.68 (0.5, m) 4.12 (2, m) 5.05 (2, s) 5.09 (0.5, m) 5.53 (1, m) 6.10 (1, m) 6.30 (1, d) 6.97 (2, d) 7.10 (2, m) 7.4 (2, m) 7.49 (2, d) 7.65 (1, s).

Example 7

Preparation of 4-(4-fluoro-benzyloxy)-cinnamate-hexyl-acrylate (Preparation of Acrylate Compound Having Photoreactive Group)

The procedures were performed in the same manner as described in Example 5, excepting that 6-hydroxy hexyl acrylate was used in place of 3-hydroxy propyl acrylate to prepare 4-(4-fluoro-benzyloxy)-cinnamate-hexyl-acrylate.

NMR (CDCl$_3$ (500 MHz), ppm): 1.09-1.21 (4, m) 1.28-1.41 (4, m) 3.73 (1, m) 4.09 (2, m) 5.01 (1, m) 5.05 (2, s) 5.85 (1, dd) 6.11 (1, m) 6.30 (1, d) 6.48 (1, dd) 6.97 (2, d) 7.10 (2, m) 7.4 (2, m) 7.49 (2, d) 7.65 (1, s).

Example 8

Preparation of 4-(4-fluoro-benzyloxy)-cinnamate-hexyl-methacrylate (Preparation of Acrylate Compound Having Photoreactive Group)

The procedures were performed in the same manner as described in Example 5, excepting that 6-hydroxy hexyl methacrylate was used in place of 3-hydroxy propyl acrylate to prepare 4-(4-fluoro-benzyloxy)-cinnamate-hexyl-methacrylate.

NMR (CDCl$_3$ (500 MHz), ppm): 1.02-1.13 (4, m) 1.20-1.31 (4, m) 1.95 (3, t) 3.65 (1, m) 3.99-4.15 (2, m) 5.05 (2, s)

5.09 (1, m) 5.56 (1, H) 6.13 (1, m) 6.30 (1, d) 6.97 (2, d) 7.10 (2, m) 7.4 (2, m) 7.49 (2, d) 7.65 (1, s).

Example 9

Preparation of
4-(4-methyl-benzyloxy)-cinnamate-propyl-acrylate
(Preparation of Acrylate Compound Having
Photoreactive Group)

The procedures were performed in the same manner as described in Example 1, excepting that 4-(4-methyl-benzyloxy)-benzaldehyde was used in place of 4-benzyloxy-benzaldehyde to prepare 4-(4-methyl-benzyloxy)-cinnamate-propyl-acrylate.

NMR (CDCl$_3$ (500 MHz), ppm): 1.14-1.30 (3, m) 2.38 (3, s) 3.63 (0.5, m) 4.12 (2, m) 5.05-5.10 (2.5, s) 5.86 (1, dd) 6.17 (1, m) 6.30 (1, d) 6.45 (1, dd) 6.97 (2, m) 7.10 (2, m) 7.4 (2, m) 7.45 (2, d) 7.65 (1, s).

Example 10

Preparation of 4-(4-methyl-benzyloxy)-cinnamate-propyl-methacrylate (Preparation of Acrylate Compound Having Photoreactive Group)

The procedures were performed in the same manner as described in Example 9, excepting that 3-hydroxy propyl methacrylate was used in place of 3-hydroxy propyl acrylate to prepare 4-(4-methyl-benzyloxy)-cinnamate-propyl-methacrylate.

NMR (CDCl$_3$ (500 MHz), ppm): 1.20-1.27 (3, m) 1.95 (3, t) 2.38 (3, s) 3.68 (0.5, m) 4.12 (2, m) 5.05-5.10 (2.5, s) 5.55 (1, m) 6.17 (1, m) 6.30 (1, d) 6.97 (2, m) 7.10 (2, m) 7.4 (2, m) 7.45 (2, d) 7.65 (1, s).

Example 11

Preparation of
4-(4-methyl-benzyloxy)-cinnamate-hexyl-acrylate
(Preparation of Acrylate Compound Having
Photoreactive Group)

The procedures were performed in the same manner as described in Example 9, excepting that 6-hydroxy hexyl acrylate was used in place of 3-hydroxy propyl acrylate to prepare 4-(4-methyl-benzyloxy)-cinnamate-hexyl-acrylate.

NMR (CDCl$_3$ (500 MHz), ppm): 1.10-1.20 (4, m) 1.21-1.43 (4, m) 2.38 (3, s) 3.73 (1, m) 4.09 (2, m) 5.00-5.09 (3, m) 5.82 (1, dd) 6.15 (1, m) 6.30 (1, d) 6.49 (1, dd) 6.97 (2, m) 7.10 (2, m) 7.4 (2, m) 7.45 (2, d) 7.65 (1, s).

Example 12

Preparation of 4-(4-methyl-benzyloxy)-cinnamate-hexyl-methacrylate (Preparation of Acrylate Compound Having Photoreactive Group)

The procedures were performed in the same manner as described in Example 9, excepting that 6-hydroxy hexyl methacrylate was used in place of 3-hydroxy propyl acrylate to prepare 4-(4-methyl-benzyloxy)-cinnamate-hexyl-methacrylate.

NMR (CDCl$_3$ (500 MHz), ppm): 1.05-1.12 (4, m) 1.23-1.38 (4, m) 1.94 (3, t) 2.38 (3, s) 3.63 (1, m) 4.00-4.15 (2, m) 5.02-5.09 (3, m) 5.56 (1, m) 6.15 (1, m) 6.30 (1, d) 6.97 (2, d) 7.10 (2, m) 7.4 (2, m) 7.45 (2, d) 7.65 (1, s).

Example 13

Preparation of
4-(4-methoxy-benzyloxy)-cinnamate-propyl-acrylate
(Preparation of Acrylate Compound Having
Photoreactive Group)

The procedures were performed in the same manner as described in Example 1, excepting that 4-(4-methoxy-benzyloxy)-benzaldehyde was used in place of 4-benzyloxy-benzaldehyde to prepare 4-(4-methoxy-benzyloxy)-cinnamate-propyl-acrylate.

NMR (CDCl$_3$ (500 MHz), ppm): 1.15-1.30 (3, m) 3.65 (0.5, m) 4.13 (2, m) 4.44 (3, s) 5.05-5.10 (2.5, m) 5.85 (1, dd) 6.11 (1, m) 6.30 (1, d) 6.48 (1, dd) 7.01 (2, d) 7.16 (2, m) 7.44 (2, m) 7.51 (2, d) 7.65 (1, s).

Example 14

Preparation of 4-(4-methoxy-benzyloxy)-cinnamate-propyl-methacrylate (Preparation of Acrylate Compound Having Photoreactive Group)

The procedures were performed in the same manner as described in Example 13, excepting that 3-hydroxy propyl methacrylate was used in place of 3-hydroxy propyl acrylate to prepare 4-(4-methoxy-benzyloxy)-cinnamate-propyl-methacrylate.

NMR (CDCl$_3$ (500 MHz), ppm): 1.19-1.30 (3, m) 1.96 (3, t) 3.68 (0.5, m) 4.00-4.15 (2, m) 4.44 (3, s) 5.05-5.10 (2.5, m) 5.65 (1, m) 6.13 (1, m) 6.30 (1, d) 7.01 (2, d) 7.16 (2, m) 7.44 (2, m) 7.51 (2, d) 7.65 (1, s).

Example 15

Preparation of
4-(4-methoxy-benzyloxy)-cinnamate-hexyl-acrylate
(Preparation of Acrylate Compound Having
Photoreactive Group)

The procedures were performed in the same manner as described in Example 13, excepting that 6-hydroxy hexyl acrylate was used in place of 3-hydroxy propyl acrylate to prepare 4-(4-methoxy-benzyloxy)-cinnamate-hexyl-acrylate.

NMR (CDCl$_3$ (500 MHz), ppm): 1.09-1.20 (4, m) 1.28-1.41 (4, m) 3.73 (1, m) 4.05-4.14 (2, m) 4.44 (3, s) 5.01-5.07 (3, m) 5.80 (1, dd) 6.12 (1, m) 6.30 (1, d) 6.47 (1, dd) 7.01 (2, d) 7.16 (2, m) 7.44 (2, m) 7.51 (2, d) 7.65 (1, s).

Example 16

Preparation of 4-(4-methoxy-benzyloxy)-cinnamate-hexyl-methacrylate (Preparation of Acrylate Compound Having Photoreactive Group)

The procedures were performed in the same manner as described in Example 13, excepting that 6-hydroxy hexyl methacrylate was used in place of 3-hydroxy propyl acrylate to prepare 4-(4-methoxy-benzyloxy)-cinnamate-hexyl-methacrylate.

NMR (CDCl$_3$ (500 MHz), ppm): 1.02-1.11 (4, m) 1.20-1.31 (4, m) 1.95 (3, t) 3.67 (1, m) 3.99-4.14 (2, m) 4.44 (3, s)

5.03-5.07 (3, m) 5.58 (1, m) 6.15 (1, m) 6.30 (1, d) 7.01 (2, d) 7.16 (2, m) 7.44 (2, m) 7.51 (2, d) 7.65 (1, s).

Example 17

Preparation of 4-(4-methylketone-benzyloxy)-cinnamate-propyl-acrylate (Preparation of Acrylate Compound Having Photoreactive Group)

The procedures were performed in the same manner as described in Example 1, excepting that 4-(4-methylketone-benzyloxy)-benzaldehyde was used in place of 4-benzyloxy-benzaldehyde to prepare 4-(4-methylketone-benzyloxy)-cinnamate-propyl-acrylate.

NMR (CDCl$_3$ (500 MHz), ppm): 1.16-1.31 (3, m) 3.65-3.68 (3.5, m) 4.00-4.18 (2, m) 5.04-5.08 (2.5, m) 5.84 (1, dd) 6.11 (1, m) 6.27 (1, d) 6.46 (1, dd) 7.0 (2, d) 7.1 (2, m) 7.4 (2, m) 7.50 (2, d) 7.65 (1, s).

Example 18

Preparation of 4-(4-methylketone-benzyloxy)-cinnamate-propyl-methacrylate (Preparation of Acrylate Compound Having Photoreactive Group)

The procedures were performed in the same manner as described in Example 17, excepting that 3-hydroxy propyl methacrylate was used in place of 3-hydroxy propyl acrylate to prepare 4-(4-methylketone-benzyloxy)-cinnamate-propyl-methacrylate.

NMR (CDCl$_3$ (500 MHz), ppm): 1.20-1.25 (3, m) 1.95 (3, t) 3.64-3.68 (3.5, m) 4.00-4.18 (2, m) 5.04-5.09 (2.5, m) 5.64 (1, m) 6.15 (1, m) 6.27 (1, d) 7.0 (2, d) 7.1 (2, m) 7.4 (2, m) 7.5 (2, d) 7.65 (1, s).

Example 19

Preparation of 4-(4-methylketone-benzyloxy)-cinnamate-hexyl-acrylate (Preparation of Acrylate Compound Having Photoreactive Group)

The procedures were performed in the same manner as described in Example 17, excepting that 6-hydroxy hexyl acrylate was used in place of 3-hydroxy propyl acrylate to prepare 4-(4-methylketone-benzyloxy)-cinnamate-hexyl-acrylate.

NMR (CDCl$_3$ (500 MHz), ppm): 1.10-1.21 (4, m) 1.25-1.40 (4, m) 3.68-3.75 (4, m) 4.05-4.12 (2, m) 5.00-5.04 (3, m) 5.80 (1, dd) 6.11 (1, m) 6.27 (1, d) 6.47 (1, dd) 7.0 (2, d) 7.1 (2, m) 7.4 (2, m) 7.5 (2, d) 7.65 (1, s).

Example 20

Preparation of 4-(4-methylketone-benzyloxy)-cinnamate-hexyl-methacrylate (Preparation of Acrylate Compound Having Photoreactive Group)

The procedures were performed in the same manner as described in Example 17, excepting that 6-hydroxy hexyl methacrylate was used in place of 3-hydroxy propyl acrylate to prepare 4-(4-methylketone-benzyloxy)-cinnamate-hexyl-methacrylate.

NMR (CDCl$_3$ (500 MHz), ppm): 1.03-1.11 (4, m) 1.25-1.33 (4, m) 1.95 (3, t) 3.64-3.70 (4, m) 3.99-4.13 (2, m) 5.02-5.06 (3, m) 5.55 (1, m) 6.14 (1, m) 6.27 (1, d) 7.0 (2, d) 7.1 (2, m) 7.4 (2, m) 7.5 (2, d) 7.65 (1, s).

Example 21

Preparation of 4-(4-benzyloxy-benzyloxy)-cinnamate-propyl-acrylate (Preparation of Acrylate Compound Having Photoreactive Group)

The procedures were performed in the same manner as described in Example 1, excepting that 4-(4-benzyloxy-benzyloxy)-benzaldehyde was used in place of 4-benzyloxy-benzaldehyde to prepare 4-(4-benzyloxy-benzyloxy)-cinnamate-propyl-acrylate.

NMR (CDCl$_3$ (500 MHz), ppm): 1.15-1.30 (3, m) 3.62 (0.5, m) 4.01-4.13 (2, m) 5.05 (0.5, m) 5.16 (4, s) 5.84 (1, dd) 5.97-6.11 (2, m) 6.14 (1, m) 6.30 (1, d) 6.46 (1, dd) 6.99-7.15 (8, d) 7.4-7.51 (5, d) 7.61 (1, s).

Example 22

Preparation of 4-(4-benzyloxy-benzyloxy)-cinnamate-propyl-methacrylate (Preparation of Acrylate Compound Having Photoreactive Group)

The procedures were performed in the same manner as described in Example 21, excepting that 3-hydroxy propyl methacrylate was used in place of 3-hydroxy propyl acrylate to prepare 4-(4-benzyloxy-benzyloxy)-cinnamate-propyl-methacrylate.

NMR (CDCl$_3$ (500 MHz), ppm): 1.18-1.23 (3, m) 1.95 (3, t) 3.65 (0.5, m) 4.00-4.15 (2, m) 5.09 (0.5, m) 5.16 (4, s) 5.62 (1, m) 5.97-6.11 (2, m) 6.15 (1, m) 6.30 (1, d) 6.99-7.15 (8, d) 7.4-7.51 (5, d) 7.61 (1, s).

Example 23

Preparation of 4-(4-benzyloxy-benzyloxy)-cinnamate-hexyl-acrylate (Preparation of Acrylate Compound Having Photoreactive Group)

The procedures were performed in the same manner as described in Example 21, excepting that 6-hydroxy hexyl acrylate was used in place of 3-hydroxy propyl acrylate to prepare 4-(4-benzyloxy-benzyloxy)-cinnamate-hexyl-acrylate.

NMR (CDCl$_3$ (500 MHz), ppm): 1.11-1.23 (4, m) 1.26-1.39 (4, m) 3.72 (1, m) 4.03-4.14 (2, m) 5.01 (1, m) 5.16 (4, s) 5.79 (1, dd) 5.97-6.14 (3, m) 6.30 (1, d) 6.46 (1, dd) 6.99-7.15 (8, d) 7.4-7.51 (5, d) 7.61 (1, s).

Example 24

Preparation of 4-(4-benzyloxy-benzyloxy)-cinnamate-hexyl-methacrylate (Preparation of Acrylate Compound Having Photoreactive Group)

The procedures were performed in the same manner as described in Example 21, excepting that 6-hydroxy hexyl methacrylate was used in place of 3-hydroxy propyl acrylate to prepare 4-(4-benzyloxy-benzyloxy)-cinnamate-hexyl-methacrylate.

NMR (CDCl$_3$ (500 MHz), ppm): 1.05-1.16 (4, m) 1.23-1.35 (4, m) 1.94 (3, t) 3.66 (1, m) 3.99-4.15 (2, m) 5.05 (1, m)

5.16 (4, s) 5.55 (1, m) 5.97-6.17 (3, m) 6.30 (1, d) 6.99-7.15 (8, d) 7.4-7.51 (5, d) 7.61 (1, s).

Example 25

Preparation of 4-(4-fluoro-phenyloxy)-benzyloxy-cinnamate-propyl-acrylate (Preparation of Acrylate Compound Having Photoreactive Group)

The procedures were performed in the same manner as described in Example 1, excepting that 4-(4-fluoro-phenyloxy)-benzyloxy-benzaldehyde was used in place of 4-benzyloxy-benzaldehyde to prepare 4-(4-fluoro-phenyloxy)-benzyloxy-cinnamate-propyl-acrylate.

NMR (CDCl$_3$ (500 MHz), ppm): 1.16-1.30 (3, m) 3.63 (0.5, m) 3.99-4.16 (2, m) 5.02-5.09 (2.5, m) 5.84 (1, dd) 6.16 (1, m) 6.30 (1, d) 6.50 (1, dd) 6.97 (2, d) 7.20 (2, m) 7.31-7.63 (8, m) 7.68 (1, s) 7.84 (2, d).

Example 26

Preparation of 4-(4-fluoro-phenyloxy)-benzyloxy-1-cinnamate-propyl-methacrylate (Preparation of Acrylate Compound Having Photoreactive Group)

The procedures were performed in the same manner as described in Example 25, excepting that 3-hydroxy propyl methacrylate was used in place of 3-hydroxy propyl acrylate to prepare 4-(4-fluoro-phenyloxy)-benzyloxy-cinnamate-propyl-methacrylate.

NMR (CDCl$_3$ (500 MHz), ppm): 1.25 (3, m) 1.94 (3, t) 3.67 (0.5, m) 4.01-4.16 (2, m) 5.07-5.09 (2.5, m) 5.53 (1, m) 6.15 (1, m) 6.30 (1, d) 6.97 (2, d) 7.20 (2, m) 7.31-7.63 (8, m) 7.68 (1, s) 7.84 (2, d).

Example 27

Preparation of 4-(4-fluoro-phenyloxy)-benzyloxy-1-cinnamate-hexyl-acrylate (Preparation of Acrylate Compound Having Photoreactive Group)

The procedures were performed in the same manner as described in Example 25, excepting that 6-hydroxy hexyl acrylate was used in place of 3-hydroxy propyl acrylate to prepare 4-(4-fluoro-phenyloxy)-benzyloxy-cinnamate-hexyl-acrylate.

NMR (CDCl$_3$ (500 MHz), ppm): 1.11-1.22 (4, m) 1.27-1.40 (4, m) 3.70 (1, m) 4.10 (2, m) 5.02-5.07 (3, m) 5.75 (1, dd) 6.16 (1, m) 6.30 (1, d) 6.45 (1, dd) 6.97 (2, d) 7.20 (2, m) 7.31-7.63 (8, m) 7.68 (1, s) 7.84 (2, d).

Example 28

Preparation of 4-(4-fluoro-phenyloxy)-benzyloxy-cinnamate-hexyl-methacrylate (Preparation of Acrylate Compound Having Photoreactive Group)

The procedures were performed in the same manner as described in Example 25, excepting that 6-hydroxy hexyl methacrylate was used in place of 3-hydroxy propyl acrylate to prepare 4-(4-fluoro-phenyloxy)-benzyloxy-cinnamate-hexyl-methacrylate.

NMR (CDCl$_3$ (500 MHz), ppm): 1.00-1.14 (4, m) 1.24-1.35 (4, m) 1.95 (3, t) 3.66 (1, m) 4.02-4.16 (2, m) 5.04-5.09 (3, m) 5.56 (1, m) 6.16 (1, m) 6.30 (1, d) 6.97 (2, d) 7.20 (2, m) 7.31-7.63 (8, m) 7.68 (1, s) 7.84 (2, d).

Example 29

Preparation of 4-(4-trifluoromethyl-benzyloxy)-cinnamate-propyl-acrylate (Preparation of Acrylate Compound Having Photoreactive Group)

The procedures were performed in the same manner as described in Example 1, excepting that 4-(4-trifluoromethyl-benzyloxy)-benzaldehyde was used in place of 4-benzyloxy-benzaldehyde to prepare 4-(4-trifluoromethyl-benzyloxy)-cinnamate-propyl-acrylate.

NMR (CDCl$_3$ (500 MHz), ppm): 1.16-1.32 (3, m) 3.60 (0.5, m) 4.00-4.13 (2, m) 5.04-5.10 (2.5, m) 5.83 (1, dd) 6.13 (1, m) 6.30 (1, d) 6.45 (1, dd) 7.11-7.25 (4, m) 7.4 (2, m) 7.60-7.68 (3, m).

Example 30

Preparation of 4-(4-trifluoromethyl-benzyloxy)-cinnamate-propyl-methacrylate (Preparation of Acrylate Compound Having Photoreactive Group)

The procedures were performed in the same manner as described in Example 29, excepting that 3-hydroxy propyl methacrylate was used in place of 3-hydroxy propyl acrylate to prepare 4-(4-trifluoromethyl-benzyloxy)-cinnamate-propyl-methacrylate.

NMR (CDCl$_3$ (500 MHz), ppm): 1.25-1.36 (3, m) 1.95 (3, t) 3.64 (0.5, m) 4.00-4.12 (2, m) 5.04-5.10 (2.5, s) 5.63 (1, m) 6.14 (1, m) 6.30 (1, d) 7.11-7.25 (4, m) 7.4 (2, m) 7.60-7.68 (3, m).

Example 31

Preparation of 4-(4-trifluoromethyl-benzyloxy)-cinnamate-hexyl-acrylate (Preparation of Acrylate Compound Having Photoreactive Group)

The procedures were performed in the same manner as described in Example 29, excepting that 6-hydroxy hexyl acrylate was used in place of 3-hydroxy propyl acrylate to prepare 4-(4-trifluoromethyl-benzyloxy)-cinnamate-hexyl-acrylate.

NMR (CDCl$_3$ (500 MHz), ppm): 1.08-1.20 (4, m) 1.25-1.40 (4, m) 3.70 (1, m) 4.08 (2, m) 5.00-5.04 (3, s) 5.82 (1, dd) 6.13 (1, m) 6.30 (1, d) 6.47 (1, dd) 7.11-7.25 (4, m) 7.4 (2, m) 7.60-7.68 (3, m).

Example 32

Preparation of 4-(4-trifluoromethyl-benzyloxy)-cinnamate-hexyl-methacrylate (Preparation of Acrylate Compound Having Photoreactive Group)

The procedures were performed in the same manner as described in Example 29, excepting that 6-hydroxy hexyl methacrylate was used in place of 3-hydroxy propyl acrylate to prepare 4-(4-trifluoromethyl-benzyloxy)-cinnamate-hexyl-methacrylate.

NMR (CDCl$_3$ (500 MHz), ppm): 1.00-1.10 (4, m) 1.23-1.36 (4, m) 1.95 (3, t) 3.71 (1, m) 4.00-4.12 (2, m) 5.00-5.06 (3, s) 5.55 (1, m) 6.18 (1, m) 6.30 (1, d) 7.11-7.25 (4, m) 7.4 (2, m) 7.60-7.68 (3, m).

Example 33

Preparation of 4-(4-bromo-benzyloxy)-cinnamate-propyl-acrylate (Preparation of Acrylate Compound Having Photoreactive Group)

The procedures were performed in the same manner as described in Example 1, excepting that 4-(4-bromo-benzyloxy)-benzaldehyde was used in place of 4-benzyloxy-benzaldehyde to prepare 4-(4-bromo-benzyloxy)-cinnamate-propyl-acrylate.

NMR (CDCl$_3$ (500 MHz), ppm): 1.23 (3, m) 3.63 (0.5, m) 4.01-4.19 (2, m) 5.04-5.09 (2.5, s) 5.81 (1, dd) 6.12 (1, m) 6.30 (1, d) 6.49 (1, dd) 6.97 (2, d) 7.1 (2, m) 7.30 (2, m) 7.45 (2, d) 7.61 (1, s).

Example 34

Preparation of 4-(4-bromo-benzyloxy)-cinnamate-propyl-methacrylate (Preparation of Acrylate Compound Having Photoreactive Group)

The procedures were performed in the same manner as described in Example 33, excepting that 3-hydroxy propyl methacrylate was used in place of 3-hydroxy propyl acrylate to prepare 4-(4-bromo-benzyloxy)-cinnamate-propyl-methacrylate.

NMR (CDCl$_3$ (500 MHz), ppm): 1.25 (3, m) 1.98 (3, t) 3.68 (0.5, m) 4.00-4.16 (2, m) 5.04-5.09 (2.5, s) 5.61 (1, m) 6.15 (1, m) 6.30 (1, d) 6.97 (2, d) 7.1 (2, m) 7.30 (2, m) 7.45 (2, d) 7.61 (1, s).

Example 35

Preparation of 4-(4-bromo-benzyloxy)-cinnamate-hexyl-acrylate (Preparation of Acrylate Compound Having Photoreactive Group)

The procedures were performed in the same manner as described in Example 33, excepting that 6-hydroxy hexyl acrylate was used in place of 3-hydroxy propyl acrylate to prepare 4-(4-bromo-benzyloxy)-cinnamate-hexyl-acrylate.

NMR (CDCl$_3$ (500 MHz), ppm): 1.12-1.22 (4, m) 1.27-1.40 (4, m) 3.72 (1, m) 4.00-4.15 (2, m) 5.01-5.08 (3, s) 5.80 (1, dd) 6.14 (1, m) 6.30 (1, d) 6.47 (1, dd) 6.97 (2, d) 7.1 (2, m) 7.30 (2, m) 7.45 (2, d) 7.61 (1, s).

Example 36

Preparation of 4-(4-bromo-benzyloxy)-cinnamate-hexyl-methacrylate (Preparation of Acrylate Compound Having Photoreactive Group)

The procedures were performed in the same manner as described in Example 33, excepting that 6-hydroxy hexyl methacrylate was used in place of 3-hydroxy propyl acrylate to prepare 4-(4-bromo-benzyloxy)-cinnamate-hexyl-methacrylate.

NMR (CDCl$_3$ (500 MHz), ppm): 1.01-1.13 (4, m) 1.21-1.32 (4, m) 1.95 (3, t) 3.66 (1, m) 4.00-4.15 (2, m) 5.04-5.09 (3, s) 5.55 (1, dd) 6.15 (1, m) 6.30 (1, d) 6.97 (2, d) 7.1 (2, m) 7.3 (2, m) 7.45 (2, d) 7.61 (1, s).

Comparative Example 1

Preparation of Cinnamate-Propyl-Acrylate

Benzaldehyde (10 g, 94 mmol), malonic acid (2 eq.), and piperidine (0.1 eq.) were dissolved in pyridine (5 eq.) and stirred at 80° C. for 5 hours. After completion of the reaction, the reaction mixture was cooled down to the room temperature and neutralized with 3M HCl. The white solid thus obtained was filtered out and dried in a vacuum oven to yield cinnamic acid.

The cinnamic acid (5 g, 19.7 mmol) and thionyl chloride (5 eq) were put in MC and stirred at 60° C. overnight. Then, the reaction mixture was removed of the unreacted thionyl chloride and the solvent under vacuum to obtain cinnamoyl chloride.

The cinnamoyl chloride (5 g, 33.7 mmol), 3-hydroxy propyl acrylate (35.0 mmol), and TEA (105 mmol) were dissolved in THF and stirred at the room temperature for 24 hours. After completion of the stirring, diethylether was added to form a precipitate, which was then filtered out. A column chromatography using a developing solvent (EA:hexane=1:4) was carried out to yield a titled product, cinnamate-propyl-acrylate.

NMR (CDCl$_3$ (500 MHz), ppm): 1.18-1.33 (3, m) 3.71 (0.5, m) 4.12 (2, m) 5.07 (0.5, m) 5.85 (1, dd) 6.19 (1, m) 6.36 (1, d) 6.48 (1, dd) 7.4-7.62 (4, m).

Example 37

Polymerization of 4-benzyloxy-cinnamate-propyl-acrylate

In a 100 ml Schlenk flask were placed 4-benzyloxy-cinnamate-propyl-acrylate (50 mmol) of Example 1 as a monomer, AIBN (0.2 mol. %), and purified toluene (300 wt. %) as a solvent. 1-octanediol (50 mol. %) was also added. Under agitation, the mixture was heated to 50° C. and stood for 5 hours to bring about a reaction.

After completion of the reaction, the reactant mixture was put in an excess of ethanol to obtain a white polymer precipitate. The precipitate was filtered out through a glass funnel to collect a polymer, which was then dried in a vacuum oven at 60° C. for 24 hours to yield a final polymer product (Mw=44 k, PDI=2.84, yield=61%).

Example 38

Polymerization of 4-benzyloxy-cinnamate-propyl-methacrylate

The procedures were performed in the same manner as described in Example 37, excepting that 4-benzyloxy-cinnamate-propyl-methacrylate (50 mmol) of Example 2 was used as a monomer in place of 4-benzyloxy-cinnamate-propyl-acrylate of Example 1 to obtain a polymer product of Example 38 (Mw=41 k, PDI=3.52, yield=47%).

Example 39

Polymerization of 4-benzyloxy-cinnamate-hexyl-acrylate

The procedures were performed in the same manner as described in Example 37, excepting that 4-benzyloxy-cinnamate-hexyl-acrylate (50 mmol) of Example 3 was used as a monomer in place of 4-benzyloxy-cinnamate-propyl-acrylate of Example 1 to obtain a polymer product of Example 39 (Mw=48 k, PDI=2.79, yield=55%).

Example 40

Polymerization of 4-benzyloxy-cinnamate-hexyl-methacrylate

The procedures were performed in the same manner as described in Example 37, excepting that 4-benzyloxy-cinnamate-hexyl-methacrylate (50 mmol) of Example 4 was used as a monomer in place of 4-benzyloxy-cinnamate-propyl-acrylate of Example 1 to obtain a polymer product of Example 40 (Mw=52 k, PDI=3.22, yield=48%).

Example 41

Polymerization of 4-(4-fluoro-benzyloxy)-cinnamate-propyl-acrylate

The procedures were performed in the same manner as described in Example 37, excepting that 4-(4-fluoro-benzyloxy)-cinnamate-propyl-acrylate (50 mmol) of Example 5 was used as a monomer in place of 4-benzyloxy-cinnamate-propyl-acrylate of Example 1 to obtain a polymer product of Example 41 (Mw=66 k, PDI=2.91, yield=53%).

Example 42

Polymerization of 4-(4-fluoro-benzyloxy)-cinnamate-propyl-methacrylate

The procedures were performed in the same manner as described in Example 37, excepting that 4-(4-fluoro-benzyloxy)-cinnamate-propyl-methacrylate (50 mmol) of Example 6 was used as a monomer in place of 4-benzyloxy-cinnamate-propyl-acrylate of Example 1 to obtain a polymer product of Example 42 (Mw=40 k, PDI=3.38, yield=44%).

Example 43

Polymerization of 4-(4-fluoro-benzyloxy)-cinnamate-hexyl-acrylate

The procedures were performed in the same manner as described in Example 37, excepting that 4-(4-fluoro-benzyloxy)-cinnamate-hexyl-acrylate (50 mmol) of Example 7 was used as a monomer in place of 4-benzyloxy-cinnamate-propyl-acrylate of Example 1 to obtain a polymer product of Example 43 (Mw=46 k, PDI=3.10, yield=36%).

Example 44

Polymerization of 4-(4-fluoro-benzyloxy)-cinnamate-hexyl-methacrylate

The procedures were performed in the same manner as described in Example 37, excepting that 4-(4-fluoro-benzyloxy)-cinnamate-hexyl-methacrylate (50 mmol) of Example 8 was used as a monomer in place of 4-benzyloxy-cinnamate-propyl-acrylate of Example 1 to obtain a polymer product of Example 44 (Mw=40 k, PDI=4.65, yield=33%).

Example 45

Polymerization of 4-(4-methyl-benzyloxy)-cinnamate-propyl-acrylate

The procedures were performed in the same manner as described in Example 37, excepting that 4-(4-methyl-benzyloxy)-cinnamate-propyl-acrylate (50 mmol) of Example 9 was used as a monomer in place of 4-benzyloxy-cinnamate-propyl-acrylate of Example 1 to obtain a polymer product of Example 45 (Mw=15 k, PDI=2.94, yield=40%).

Example 46

Polymerization of 4-(4-methyl-benzyloxy)-cinnamate-propyl-methacrylate

The procedures were performed in the same manner as described in Example 37, excepting that 4-(4-methyl-benzyloxy)-cinnamate-propyl-methacrylate (50 mmol) of Example 10 was used as a monomer in place of 4-benzyloxy-cinnamate-propyl-acrylate of Example 1 to obtain a polymer product of Example 46 (Mw=21 k, PDI=3.47, yield=43%).

Example 47

Polymerization of 4-(4-methyl-benzyloxy)-cinnamate-hexyl-acrylate

The procedures were performed in the same manner as described in Example 37, excepting that 4-(4-methyl-benzyloxy)-cinnamate-hexyl-acrylate (50 mmol) of Example 11 was used as a monomer in place of 4-benzyloxy-cinnamate-propyl-acrylate of Example 1 to obtain a polymer product of Example 47 (Mw=18 k, PDI=4.01, yield=26%).

Example 48

Polymerization of 4-(4-methyl-benzyloxy)-cinnamate-hexyl-methacrylate

The procedures were performed in the same manner as described in Example 37, excepting that 4-(4-methyl-benzyloxy)-cinnamate-hexyl-methacrylate (50 mmol) of Example 12 was used as a monomer in place of 4-benzyloxy-cinnamate-propyl-acrylate of Example 1 to obtain a polymer product of Example 48 (Mw=22 k, PDI=3.59, yield=31%).

Example 49

Polymerization of 4-(4-methoxyl-benzyloxy)-cinnamate-propyl-acrylate

The procedures were performed in the same manner as described in Example 37, excepting that 4-(4-methoxyl-benzyloxy)-cinnamate-propyl-acrylate (50 mmol) of Example 13 was used as a monomer in place of 4-benzyloxy-cinnamate-propyl-acrylate of Example 1 to obtain a polymer product of Example 49 (Mw=59 k, PDI=3.06, yield=54%).

Example 50

Polymerization of 4-(4-methoxyl-benzyloxy)-cinnamate-propyl-methacrylate

The procedures were performed in the same manner as described in Example 37, excepting that 4-(4-methoxyl-benzyloxy)-cinnamate-propyl-methacrylate (50 mmol) of Example 14 was used as a monomer in place of 4-benzyloxycinnamate-propyl-acrylate of Example 1 to obtain a polymer product of Example 50 (Mw=55 k, PDI=3.47, yield=50%).

Example 51

Polymerization of 4-(4-methoxyl-benzyloxy)-cinnamate-hexyl-acrylate

The procedures were performed in the same manner as described in Example 37, excepting that 4-(4-methoxyl-benzyloxy)-cinnamate-hexyl-acrylate (50 mmol) of Example 15 was used as a monomer in place of 4-benzyloxy-cinnamate-propyl-acrylate of Example 1 to obtain a polymer product of Example 51 (Mw=68 k, PDI=3.14, yield=64%).

Example 52

Polymerization of 4-(4-methoxyl-benzyloxy)-cinnamate-hexyl-methacrylate

The procedures were performed in the same manner as described in Example 37, excepting that 4-(4-methoxyl-benzyloxy)-cinnamate-hexyl-methacrylate (50 mmol) of Example 16 was used as a monomer in place of 4-benzyloxy-cinnamate-propyl-acrylate of Example 1 to obtain a polymer product of Example 52 (Mw=54 k, PDI=3.63, yield=60%).

Example 53

Polymerization of 4-(4-methylketone-benzyloxy)-cinnamate-propyl-acrylate

The procedures were performed in the same manner as described in Example 37, excepting that 4-(4-methylketone-benzyloxy)-cinnamate-propyl-acrylate (50 mmol) of Example 17 was used as a monomer in place of 4-benzyloxy-cinnamate-propyl-acrylate of Example 1 to obtain a polymer product of Example 53 (Mw=15 k, PDI=2.86, yield=20%).

Example 54

Polymerization of 4-(4-methylketone-benzyloxy)-cinnamate-propyl-methacrylate

The procedures were performed in the same manner as described in Example 37, excepting that 4-(4-methylketone-benzyloxy)-cinnamate-propyl-methacrylate (50 mmol) of Example 18 was used as a monomer in place of 4-benzyloxy-cinnamate-propyl-acrylate of Example 1 to obtain a polymer product of Example 54 (Mw=10 k, PDI=3.95, yield=18%).

Example 55

Polymerization of 4-(4-methylketone-benzyloxy)-cinnamate-hexyl-acrylate

The procedures were performed in the same manner as described in Example 37, excepting that 4-(4-methylketone-benzyloxy)-cinnamate-hexyl-acrylate (50 mmol) of Example 19 was used as a monomer in place of 4-benzyloxy-cinnamate-propyl-acrylate of Example 1 to obtain a polymer product of Example 55 (Mw=13 k, PDI=4.06, yield=25%).

Example 56

Polymerization of 4-(4-methylketone-benzyloxy)-cinnamate-hexyl-methacrylate

The procedures were performed in the same manner as described in Example 37, excepting that 4-(4-methylketone-benzyloxy)-cinnamate-hexyl-methacrylate (50 mmol) of Example 20 was used as a monomer in place of 4-benzyloxy-cinnamate-propyl-acrylate of Example 1 to obtain a polymer product of Example 56 (Mw=15 k, PDI=3.57, yield=20%).

Example 57

Polymerization of 4-(4-benzyloxy-benzyloxy)-cinnamate-propyl-acrylate

The procedures were performed in the same manner as described in Example 37, excepting that 4-(4-benzyloxy-benzyloxy)-cinnamate-propyl-acrylate (50 mmol) of Example 21 was used as a monomer in place of 4-benzyloxy-cinnamate-propyl-acrylate of Example 1 to obtain a polymer product of Example 57 (Mw=36 k, PDI=2.61, yield=45%).

Example 58

Polymerization of 4-(4-benzyloxy-benzyloxy)-cinnamate-propyl-methacrylate

The procedures were performed in the same manner as described in Example 37, excepting that 4-(4-benzyloxy-benzyloxy)-cinnamate-propyl-methacrylate (50 mmol) of Example 22 was used as a monomer in place of 4-benzyloxy-cinnamate-propyl-acrylate of Example 1 to obtain a polymer product of Example 58 (Mw=25 k, PDI=3.92, yield=40%).

Example 59

Polymerization of 4-(4-benzyloxy-benzyloxy)-cinnamate-hexyl-acrylate

The procedures were performed in the same manner as described in Example 37, excepting that 4-(4-benzyloxy-benzyloxy)-cinnamate-hexyl-acrylate (50 mmol) of Example 23 was used as a monomer in place of 4-benzyloxy-cinnamate-propyl-acrylate of Example 1 to obtain a polymer product of Example 59 (Mw=32 k, PDI=3.28, yield=43%).

Example 60

Polymerization of 4-(4-benzyloxy-benzyloxy)-cinnamate-hexyl-methacrylate

The procedures were performed in the same manner as described in Example 37, excepting that 4-(4-benzyloxy-benzyloxy)-cinnamate-hexyl-methacrylate (50 mmol) of Example 24 was used as a monomer in place of 4-benzyloxy-cinnamate-propyl-acrylate of Example 1 to obtain a polymer product of Example 60 (Mw=48 k, PDI=3.71, yield=57%).

Example 61

Polymerization of 4-(4-fluoro-phenyloxy)-benzyloxy-cinnamate-propyl-acrylate

The procedures were performed in the same manner as described in Example 37, excepting that 4-(4-fluoro-phenyloxy)-benzyloxy-cinnamate-propyl-acrylate (50 mmol) of Example 25 was used as a monomer in place of 4-benzyloxycinnamate-propyl-acrylate of Example 1 to obtain a polymer product of Example 61 (Mw=57 k, PDI=3.08, yield=63%).

Example 62

Polymerization of 4-(4-fluoro-phenyloxy)-benzyloxy-cinnamate-propyl-methacrylate The procedures were performed in the same manner as described in Example 37, excepting that 4-(4-fluoro-phenyloxy)-benzyloxy-cinnamate-propyl-methacrylate (50 mmol) of Example 26 was used as a monomer in place of 4-benzyloxy-cinnamate-propyl-acrylate of Example 1 to obtain a polymer product of Example 62 (Mw=60 k, PDI=3.38, yield=51%).

Example 63

Polymerization of 4-(4-fluoro-phenyloxy)-benzyloxy-cinnamate-hexyl-acrylate

The procedures were performed in the same manner as described in Example 37, excepting that 4-(4-fluoro-phenyloxy)-benzyloxy-cinnamate-hexyl-acrylate (50 mmol) of Example 27 was used as a monomer in place of 4-benzyloxy-cinnamate-propyl-acrylate of Example 1 to obtain a polymer product of Example 63 (Mw=48 k, PDI=2.69, yield=48%).

Example 64

Polymerization of 4-(4-fluoro-phenyloxy)-benzyloxy-cinnamate-hexyl-methacrylate

The procedures were performed in the same manner as described in Example 37, excepting that 4-(4-fluoro-phenyloxy)-benzyloxy-cinnamate-hexyl-methacrylate (50 mmol) of Example 28 was used as a monomer in place of 4-benzyloxy-cinnamate-propyl-acrylate of Example 1 to obtain a polymer product of Example 64 (Mw=40 k, PDI=3.29, yield=39%).

Example 65

Polymerization of 4-(4-trifluoromethyl-benzyloxy)-cinnamate-propyl-acrylate

The procedures were performed in the same manner as described in Example 37, excepting that 4-(4-trifluoromethyl-benzyloxy)-cinnamate-propyl-acrylate (50 mmol) of Example 29 was used as a monomer in place of 4-benzyloxy-cinnamate-propyl-acrylate of Example 1 to obtain a polymer product of Example 65 (Mw=51 k, PDI=3.61, yield=52%).

Example 66

Polymerization of 4-(4-trifluoromethyl-benzyloxy)-cinnamate-propyl-methacrylate

The procedures were performed in the same manner as described in Example 37, excepting that 4-(4-trifluoromethyl-benzyloxy)-cinnamate-propyl-methacrylate (50 mmol) of Example 30 was used as a monomer in place of 4-benzyloxy-cinnamate-propyl-acrylate of Example 1 to obtain a polymer product of Example 66 (Mw=43 k, PDI=3.52, yield=47%).

Example 67

Polymerization of 4-(4-trifluoromethyl-benzyloxy)-cinnamate-hexyl-acrylate

The procedures were performed in the same manner as described in Example 37, excepting that 4-(4-trifluoromethyl-benzyloxy)-cinnamate-hexyl-acrylate (50 mmol) of Example 31 was used as a monomer in place of 4-benzyloxy-cinnamate-propyl-acrylate of Example 1 to obtain a polymer product of Example 67 (Mw=66 k, PDI=3.85, yield=53%).

Example 68

Polymerization of 4-(4-trifluoromethyl-benzyloxy)-cinnamate-hexyl-methacrylate

The procedures were performed in the same manner as described in Example 37, excepting that 4-(4-trifluoromethyl-benzyloxy)-cinnamate-hexyl-methacrylate (50 mmol) of Example 32 was used as a monomer in place of 4-benzyloxy-cinnamate-propyl-acrylate of Example 1 to obtain a polymer product of Example 68 (Mw=60 k, PDI=3.73, yield=58%).

Example 69

Polymerization of 4-(4-bromo-benzyloxy)-cinnamate-propyl-acrylate

The procedures were performed in the same manner as described in Example 37, excepting that 4-(4-bromo-benzyloxy)-cinnamate-propyl-acrylate (50 mmol) of Example 33 was used as a monomer in place of 4-benzyloxy-cinnamate-propyl-acrylate of Example 1 to obtain a polymer product of Example 69 (Mw=76 k, PDI=3.23, yield=69%).

Example 70

Polymerization of 4-(4-bromo-benzyloxy)-cinnamate-propyl-methacrylate

The procedures were performed in the same manner as described in Example 37, excepting that 4-(4-bromo-benzyloxy)-cinnamate-propyl-methacrylate (50 mmol) of Example 34 was used as a monomer in place of 4-benzyloxy-cinnamate-propyl-acrylate of Example 1 to obtain a polymer product of Example 70 (Mw=83 k, PDI=3.69, yield=60%).

Example 71

Polymerization of 4-(4-bromo-benzyloxy)-cinnamate-hexyl-acrylate

The procedures were performed in the same manner as described in Example 37, excepting that 4-(4-bromo-benzyloxy)-cinnamate-hexyl-acrylate (50 mmol) of Example 35 was used as a monomer in place of 4-benzyloxy-cinnamate-propyl-acrylate of Example 1 to obtain a polymer product of Example 71 (Mw=58 k, PDI=4.09, yield=62%).

Example 72

Polymerization of 4-(4-bromo-benzyloxy)-cinnamate-hexyl-methacrylate

The procedures were performed in the same manner as described in Example 37, excepting that 4-(4-bromo-benzyloxy)-cinnamate-hexyl-methacrylate (50 mmol) of Example 36 was used as a monomer in place of 4-benzyloxy-cinnamate-propyl-acrylate of Example 1 to obtain a polymer product of Example 72 (Mw=50 k, PDI=3.34, yield=55%).

Comparative Example 2

Polymerization of cinnamate-propyl-acrylate

The procedures were performed in the same manner as described in Example 37, excepting that cinnamate-propyl-acrylate (50 mmol) of Comparative Example 1 was used as a monomer in place of 4-benzyloxy-cinnamate-propyl-acrylate of Example 1 to obtain a polymer product of Comparative Example 2 (Mw=56 k, PDI=3.06, yield=57%).

Comparative Example 3

Polymerization of 4-benzyl-cinnamate-5-norbornene

In a 100 ml Schlenk flask were placed 4-benzyloxy-cinnamate-5-norbornene (50 mmol) and then purified THF (400 wt. %) as a solvent. Then, 1-octene (20 mol. %) was added. Under agitation, the mixture was heated to 90° C. To the flask were added Pd(OAc)$_2$ (16 μmol) and tricyclohexylphosphine (32 μmol) in 1 ml of dichloromethane as catalysts, and dimethylanilinium tetrakis(pentafluorophenyl)borate (32 μmol) as a cocatalyst. The mixture was stirred at 90° C. for 16 hours to bring about a reaction.

After completion of the reaction, the reactant mixture was put in an excess of ethanol to obtain a white polymer precipitate. The precipitate was filtered out through a glass funnel to collect a polymer, which was then dried in a vacuum oven at 60° C. for 24 hours to yield a final polymer product (Mw=89 k, PDI=2.96, yield=65%).

Experimental Example 1

Fabrication of Liquid Crystal Film 2 to 3 wt. % of each photoreactive acrylate polymer of Examples 37 to 72 and Comparative Example 2, 0.5 to 1.0 wt. % of a binder (i.e., an acryl-based binder of PETA, DPHA or triacryl isocyanurate), and 0.05 to 1 wt. % of a photo initiator (Irgacure 907, Ciba) were dissolved in a toluene solvent, and the resultant solution was put dropwise on a glass substrate or a polymer film (i.e., a cyclic olefin-based oriented film or a TAC film) for bar coating. The bar-coated film was dried at 80° C. for 2 min. and exposed to polarized UV radiation. To ascertain that the orientation of liquid crystals is changed, the cured alignment layer half covered was rotated by 90 degrees and exposed to the polarized UV radiation again. The exposure amount of the polarized UV radiation was regulated by the exposure time. A-plate liquid crystal (25 wt. % in toluene) was put dropwise on the alignment layer for bar coating, dried at 60° C. for 2 min. and exposed to 20 mJ of UV radiation for curing.

Figure 2:
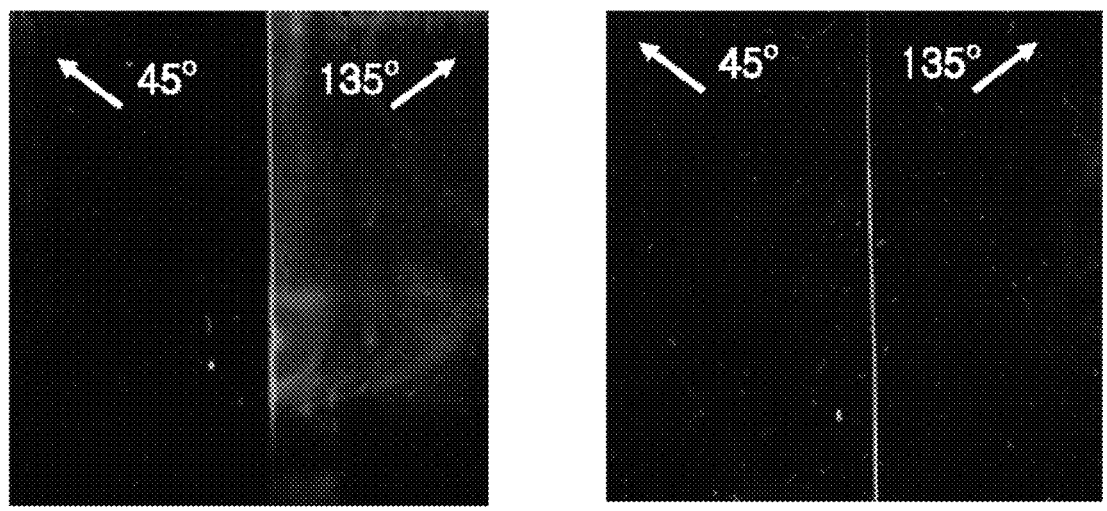
FIG. 2 shows photographs of photo-alignment layers using the polymers of Comparative Examples and Examples in Experimental Examples after first and second alignments while changing the polarization direction of radiation.

FIG. 2 shows the images of photo-alignment layers, that is, a first oriented alignment layer (45°) before 90-degree rotation and a second oriented alignment layer (135°) after 90-degree rotation between polarizers. The lower picture of FIG. 2 shows the photo-alignment layer using the polymer of Comparative Example 2 as a photo-alignment material after the second alignment, the upper picture showing the photo-alignment layer using the polymer of Example 41 as a photo-alignment material after the second alignment. The pictures were taken of the films placed between two crossed polarizers.

Referring to FIG. 2, the photo-alignment layer using the polymer of Comparative Example 2 hardly had a change in the alignment direction even when the polarization direction of radiation is changed during the second alignment, causing alignment errors. In contrast, the photo-alignment layer using the polymer of Example 42 was readily changed in the alignment direction upon a change of the polarization direction during the second alignment, acquiring a good-quality image. This phenomenon presumably results from the fact that the bulky aralkyl structure at the ends of the photoreactive groups in the polymer of the Example provides a large free volume between adjacent photoreactive groups, thereby offering readiness for change in the alignment direction based on the polarization direction of radiation as well as excellences in photoreactivity, alignment properties, and alignment rate.

Figure 3:
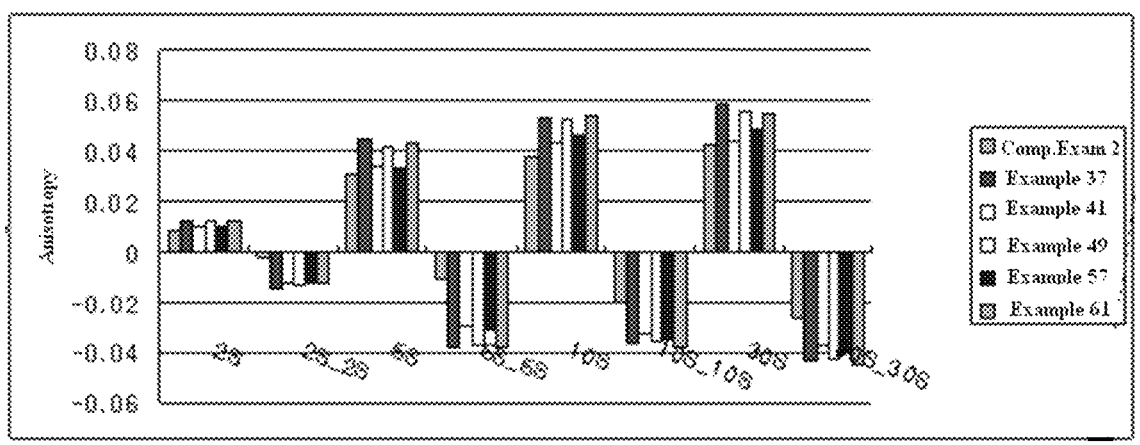
FIG. 3 show graphs describing the change of anisotropy of photo-alignment layers using the polymers of Comparative Examples and Examples in Experimental Examples after first and second alignments while changing the polarization direction of radiation.

The same procedures as described in regards to FIG. 2 were performed to bring about first and second alignments on the photo-alignment layers using each polymer of Examples 37, 41, 49, 57 and 61 and Comparative Example 2 to measure the behaviors of anisotropic change. The first and second alignments were carried out on the photo-alignment layers four times each, while varying the irradiation time as 2 sec. (that is, performing a two-second exposure for the first alignment and, after changing the alignment direction, a two-second exposure for the second alignment), 5 sec., 10 sec. and 30 sec. The anisotropic change as can be seen from the experiment results is depicted as the graphs of FIG. 3. Referring to FIG. 3, the first and second leftmost graphs show the anisotropic change after first and second alignments using a two-second exposure, and the third and fourth graphs, the fifth and sixth graphs, and the seventh and eighth graphs show the anisotropic change after first and second alignments using five-second, ten-second and thirty-second exposures, respectively.

The anisotropic change was measured by means of UV absorbance. For anisotropy measurement, polarizers were arranged in a UV-vis spectrometer to determine absorbance A(parallel) and absorbance A(perpendicular) and calculate DR=(A(∥)−A(⊥))/(A(∥)+A(⊥)), where the reference wavelength was 310 nm.

Referring to FIG. 3, the photo-alignment layer using the polymer of Comparative Example 2 had a little bit anisotropic change after the first alignment, but with a considerable decrease in the absolute value of the anisotropy after the second alignment. This implicitly shows that the photo-alignment layer does not have readiness for change in the alignment direction during the second alignment, possibly leading to alignment errors when liquid crystals are placed upward.

Contrarily, the photo-alignment layer using each polymer of the Examples does not have a great decrease in the absolute value of anisotropy even after the second alignment but exhibits anisotropy that it can readily change in the alignment direction. This demonstrates that each polymer of the Examples has excellences in alignment properties and alignment rate and also readiness for change in the alignment direction based on the polarized direction of radiation.

Experimental Example 2

Evaluation of Solubility of Photoreactive Polymer

The photoreactive acrylate polymers of Examples 37 and 72 and Comparative Example 2 and the photoreactive norbornene polymer of Comparative Example 3 were measured and evaluated in regards to the solubility to organic solvents.

For solubility measurement, 1 g of each polymer was dissolved in 10 g of a mixed solvent of toluene and methylethylketone (MEK) at the room temperature for 12 hours, and the turbidity was measured. With the lower turbidity (unit: NTU), the polymer was evaluated to have the higher solubility. The turbidity was measured with a turbidimeter, 2100N manufactured by HACH. Prior to the measurement, a calibration of the equipment was performed with a calibration ampule kit for 2100N supplied by HACH. Then, each polymer of the Examples was measured in regards to the turbidity. The solubility measurement results are presented in the following Table 1.

TABLE 1

| Polymer | Solvent | Turbidity (NTU) |
|---|---|---|
| Example 37 | Toluene | 1.2 |
|  | MEK | 0.9 |
| Example 72 | Toluene | 1.4 |
|  | MEK | 1.0 |
| Comparative Example 2 | Toluene | 9.3 |
|  | MEK | 6.7 |
| Comparative Example 3 | Toluene | 6.8 |
|  | MEK | 5.2 |

Referring to Table 1, the photoreactive acrylate polymers of the Examples had high solubility to organic solvents and hence good workability in forming a photo-alignment layer, while the polymers of the Comparative Examples were inferior in solubility and workability to those of the Examples.

What is claimed is:

1. A photoreactive acrylate polymer comprising a repeating unit of the following formula 3:

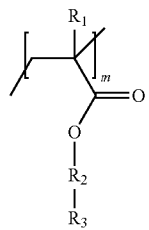

[Formula 3]

wherein m is 50 to 5,000;
R1 is hydrogen or substituted or unsubstituted alkyl having 1 to 3 carbon atoms;
R2 is a chemical bond or a substituted or unsubstituted linear or branched alkylene radical having 1 to 20 carbon atoms; and
R3 is at least one radical bonded to R2 and represented by the following formula 1a:

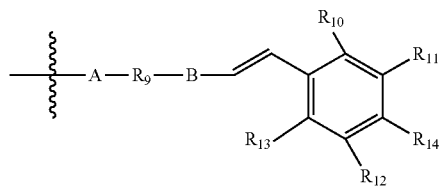

[Formula 1a]

wherein A is chemical bond, oxygen, sulfur, or —NH—;
B is selected from the group consisting of chemical bond, substituted or unsubstituted alkylene having 1 to 20 carbon atoms, carbonyl, —C(=O)O—, —O—C(=O)—, substituted or unsubstituted arylene having 6 to 40 carbon atoms, and substituted or unsubstituted heteroarylene having 6 to 40 carbon atoms;
R9 is selected from the group consisting of chemical bond, substituted or unsubstituted alkylene having 1 to 20 carbon atoms, substituted or unsubstituted alkenylene having 2 to 20 carbon atoms, substituted or unsubstituted cycloalkylene having 3 to 12 carbon atoms, substituted or unsubstituted arylene having 6 to 40 carbon atoms, substituted or unsubstituted aralkylene having 7 to 15 carbon atoms, and substituted or unsubstituted alkynylene having 2 to 20 carbon atoms; and
at least one of R10 to R14 is a radical represented by -L-R15-R16-(substituted or unsubstituted aryl having 6 to 40 carbon atoms),
wherein among the R10 to R14, the remainders other than the radical of -L-R15-R16-(substituted or unsubstituted aryl having 6 to 40 carbon atoms) are the same as or different from one another and independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, and heteroaryl having 6 to 40 carbon atoms with hetero elements in Group 14, 15 or 16;
L is selected from the group consisting of oxygen, sulfur, —NH—, substituted or unsubstituted alkylene having 1 to 20 carbon atoms, carbonyl, —C(=O)O—, —O—C(=O)—, —CONH—, and substituted or unsubstituted arylene having 6 to 40 carbon atoms;
R15 is substituted or unsubstituted alkylene having 1 to 10 carbon atoms; and
R16 is selected from the group consisting of chemical bond, —O—, —C(=O)O—, —OC(=O)—, —NH—, —S—, and —C(=O)—.

2. The photoreactive acrylate polymer as claimed in claim 1, wherein the radical of -L-R15-R16-(substituted or unsubstituted aryl having 6 to 40 carbon atoms) is represented by the following formula 2:

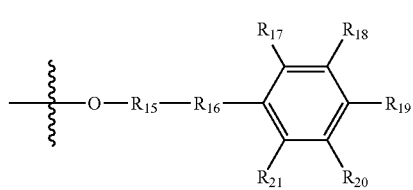

[Formula 2]

wherein R15 and R16 are as defined in formula 1; and
R17 to R21 are the same as or different from one another and independently selected from the group consisting of hydrogen, halogen, substituted or unsubstituted alkyl having 1 to 20 carbon atoms, substituted or unsubstituted alkoxy having 1 to 20 carbon atoms, substituted or unsubstituted aryloxy having 6 to 30 carbon atoms, substituted or unsubstituted aryl having 6 to 40 carbon atoms, heteroaryl having 6 to 40 carbon atoms with hetero elements in Group 14, 15 or 16, and substituted or unsubstituted alkoxyaryl having 6 to 40 carbon atoms.

3. The photoreactive acrylate polymer as claimed in claim 1, wherein the photoreactive acrylate polymer has a weight average molecular weight of 10,000 to 1,000,000.

4. A method for preparing the photoreactive acrylate polymer as claimed in claim 1, comprising:
performing a radical polymerization reaction using a monomer represented by the following formula 1 in the presence of an initiator:

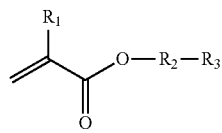

[Formula 1]

wherein R1, R2, and R3 are as defined in the formula 3.

5. The method as claimed in claim 4, wherein the initiator is at least one selected from the group consisting of AIBN, benzoyl peroxide, t-butyl peroxide, tert-amyl peroxybenzoate, 1,1'-azobis(cyclohexane carbonitrile), 2,2-bis(tert-butyl peroxy)butane, 1,1-bis(tert-butyl peroxy)cyclohexane, 2,5-bis(tert-butyl peroxy)-2,5-dimethylhexane, 2,5-bis(tert-butyl peroxy)-2,5-dimethyl-3-hexine, bis(1-(tert-butyl peroxy)-1-methylethyl)benzene, 1,1-bis(tert-butyl peroxy)-3,3,5-trimethylcyclohexane, tert-butyl hydroperoxide, tert-butyl peracetate, tert-butyl peroxy isopropyl carbonate, cumene hydroperoxide, cyclohexanone peroxide, dicumyl peroxide, lauroyl peroxide, and peracetic acid.

6. The method as claimed in claim 4, wherein the polymerization step is performed at 10 to 150° C.

7. A photo-alignment layer comprising the photoreactive acrylate polymer as claimed in claim 1.

8. The photo-alignment layer as claimed in claim 7, further comprising a binder resin.

9. The photo-alignment layer as claimed in claim 8, wherein the binder resin comprises a crosslinked polymer of a (meth)acrylate compound having an at least bi-functional acrylate group.

10. The photo-alignment layer as claimed in claim 9, wherein the crosslinked polymer of the binder resin is crosslinked or cured with at least part of the acrylate compound having a photoreactive group.

11. A liquid crystal retardation film comprising: the photo-alignment layer as claimed in claim 7, and a liquid crystal layer formed on the photo-alignment layer.

* * * * *